United States Patent
Suciu et al.

(10) Patent No.: US 7,814,113 B2
(45) Date of Patent: Oct. 12, 2010

(54) EFFICIENT TOP-K QUERY EVALUATION ON PROBABILISTIC DATA

(75) Inventors: Dan Suciu, Seattle, WA (US); Christopher Re, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 410 days.

(21) Appl. No.: 11/935,230

(22) Filed: Nov. 5, 2007

(65) Prior Publication Data

US 2008/0109428 A1    May 8, 2008

Related U.S. Application Data

(60) Provisional application No. 60/864,697, filed on Nov. 7, 2006.

(51) Int. Cl.
*G06F 7/00* (2006.01)
(52) U.S. Cl. .................. 707/758; 707/713; 707/780
(58) Field of Classification Search .................. None
See application file for complete search history.

(56) References Cited

U.S. PATENT DOCUMENTS

| | | | | |
|---|---|---|---|---|
| 5,675,819 A * | 10/1997 | Schuetze | .................. | 704/10 |
| 6,370,525 B1 * | 4/2002 | Kaufman | .................. | 707/3 |
| 6,801,909 B2 * | 10/2004 | Delgado et al. | .................. | 707/4 |
| 6,947,934 B1 * | 9/2005 | Chen et al. | .................. | 707/7 |
| 7,047,242 B1 * | 5/2006 | Ponte | .................. | 707/10 |
| 7,251,648 B2 * | 7/2007 | Chaudhuri et al. | .................. | 707/3 |
| 2008/0033915 A1 * | 2/2008 | Chen et al. | .................. | 707/3 |

OTHER PUBLICATIONS

Das et al., Answering Top-k Queries Using Views, Sep. 2006, VLDB Endowment, pp. 451-462.*
Marian et al., Evaluating Top-k Queries Over Web-Accessible Databases, Jun. 2004, ACM, vol. 29, Issue 2, pp. 319-362.*
Nambiar et al., Mining Approximate Functional Dependencies and Concept Similarities to Answer Imprecise Queries, Jun. 2004, ACM, pp. 73-78.*

* cited by examiner

*Primary Examiner*—Apu M Mofiz
*Assistant Examiner*—Jessica N Le

(57) ABSTRACT

A novel approach that computes and efficiently ranks the top-k answers to a query on a probabilistic database. The approach identifies the top-k answers, since imprecisions in the data often lead to a large number of answers of low quality. The algorithm is used to run several Monte Carlo simulations in parallel, one for each candidate answer, and approximates the probability of each only to the extent needed to correctly determine the top-k answers. The algorithm is provably optimal and scales to large databases. A more general application can identify a number of top-rated entities of a group that satisfy a condition, based on a criteria or score computed for the entities. Also disclosed are several optimization techniques. One option is to rank the top-rated results; another option provides for interrupting the iteration to return the number of top-rated entities that have thus far been identified.

21 Claims, 8 Drawing Sheets

```
  ⎧ AMZNReviews(asin, title, customer, rating, ...)
12⎨ AMZNDirector(asin, director)
  ⎩ AMZNActor(asin, actor)
  ⎧ IMDBMovie(mid, movieTitle, genre, did, year)
14⎨ IMDBDirector(did, dirName)
  ⎪ IMDBCast(mid, aid)
  ⎩ IMDBActor(aid, actorName)
16∼ TitleMatch^p(asin, mid, p)
```

FIG. 1

TitleMatch^p

| | asin | mid | p |
|---|---|---|---|
| $t_1$ | a282 ("12 Monkeys") | m897 ("Twelve Monkeys") | 0.4 |
| $t_2$ | | m389 ("Twelve Monkeys (1995)") | 0.3 |
| $t_3$ | | m656 ("Monk") | 0.013 |
| $t_4$ | a845 ("Monkey Love") | m897 ("Twelve Monkeys") | 0.35 |
| $t_5$ | | m845 ("Love Story") | 0.27 |

FIG. 2

```
SELECT DISTINCT d.dirName AS Director
FROM AMZNReviews a, AMZNReviews b,
    TitleMatch ax, TitleMatch by,
    IMDBMovie x, IMDBMovie y,
    IMDBDirector d
WHERE a.asin=ax.asin and b.asin=by.asin
    and ax.mid=x.mid and by.mid=y.mid
    and x.did=y.did and y.did=d.did
    and x.genre='comedy' and y.genre='drama'
    and abs(x.year - y.year) <= 5
    and a.rating>4 and b.rating<2
```

FIG. 3

| Rank | Director | p |
|---|---|---|
| 1 | Woody Allen | 0.9998 |
| 2 | Ralph Senensky | 0.715017 |
| 3 | Fred Olen Ray | 0.701627 |
| 4 | George Cukor | 0.665626 |
| 5 | Stewart Raffill | 0.645483 |
| ... | ... | ... |

TitleMatch$^p$

| | asin | mid | p |
|---|---|---|---|
| $t_1$ | a282 | m897 | $p_1$ |
| $t_2$ | a282 | m389 | $p_2$ |
| $t_3$ | a282 | m656 | $p_3$ |
| $t_4$ | a845 | m897 | $p_4$ |
| $t_5$ | a845 | m845 | $p_5$ |

40

$Mod(\text{TitleMatch}^p)$:

| i | $W_i$ | $\mathbf{P}(W_i)$ |
|---|---|---|
| 1 | $\emptyset$ | $(1-p_1-p_2-p_3)(1-p_4-p_5)$ |
| 2 | $t_1$ | $p_1(1-p_4-p_5)$ |
| 3 | $t_2$ | $p_2(1-p_4-p_5)$ |
| 4 | $t_3$ | $p_3(1-p_4-p_5)$ |
| 5 | $t_4$ | $(1-p_1-p_2-p_3)p_4$ |
| 6 | $t_1t_4$ | $p_1p_4$ |
| 7 | $t_2t_4$ | $p_2p_4$ |
| 8 | $t_3t_4$ | $p_3p_4$ |
| 9 | $t_5$ | $(1-p_1-p_2-p_3)p_5$ |
| 10 | $t_1t_5$ | $p_1p_5$ |
| 11 | $t_2t_5$ | $p_2p_5$ |
| 12 | $t_3t_5$ | $p_3p_5$ |

| Probabilistic Table Name | #Tuples | #exclusive tuples ||
|---|---|---|---|
| | | Avg. | Max |
| MovieToAsin | 339095 | 4 | 13 |
| AmazonReviews | 292680 | 1 | 1 |
| ActorMatch | 6758782 | 21 | 2541 |
| DirectorMatch | 18832 | 2 | 36 |
| UsenetMatch | 134803 | 5 | 203 |
| UsenetReview | 3159 | 1 | 3159 |
| ActivityData | 2614480 | 3 | 10 |
| HMM | 100 | 10 | 10 |

| Query name | # of groups ($n$) | Avg group size $m$ | | Max group size | | # of prob. tables ($m$) |
|---|---|---|---|---|---|---|
| | | no SP | SP | no SP | SP | |
| SS | 33 | 20.4 | 8.4 | 63 | 26 | 2 |
| SL | 16 | 117.7 | 77.5 | 685 | 377 | 4 |
| LS | 3259 | 3.03 | 2.2 | 30 | 8 | 2 |
| LL | 1415 | 234.8 | 71.0 | 9088 | 226 | 4 |

EFFICIENT TOP-K QUERY EVALUATION ON PROBABILISTIC DATA

RELATED APPLICATIONS

This application is based on a prior copending provisional application Ser. No. 60/864,697, filed on Nov. 7, 2006, the benefit of the filing date of which is hereby claimed under 35 U.S.C. §119(e).

GOVERNMENT RIGHTS

This invention was made with government support under Contract or Grant Nos. 0092955 and 0513877 awarded by the National Science Foundation (NSF). The government has certain rights in the invention.

BACKGROUND

A number of applications today need to manage data that are imprecise. For example, imprecisions arise in fuzzy object matching across multiple databases, in data extracted automatically from unstructured text, in automatic schema alignments, in sensor data, and in activity recognition data. Clearly, there are many other types of imprecise data. In some cases, it is possible to eliminate the imprecisions completely, but this approach is usually very costly, like manual removal of ambiguous matches in data cleaning. In other cases, complete removal of imprecision is not even possible, e.g., in human activity recognition.

Modern enterprise applications are forced to deal with unreliable and imprecise information, but they can often tolerate such imprecisions, especially in applications like search or business intelligence. However, a system that tolerates imprecisions needs to be able to rank query results based on the degree of their uncertainty. It would therefore be desirable to develop techniques to automatically manage imprecisions in data, and also, to rank query answers according to the probability that the answers are correct. A technique for efficiently accomplishing such a task is not currently available.

SUMMARY

A probabilistic database can be employed in connection with addressing the above-described problem. A simplistic definition is that every tuple belonging to a probabilistic database has some probability with a value between 0 and 1. Every tuple is thus a probabilistic event, and tuples may be correlated events. The major difficulty arising in the use of probabilistic databases is evaluating queries of such data correctly and efficiently. It has recently been shown that most SQL queries have #P-complete data complexity, which rules out efficient algorithms for determining exact probabilities.

A novel exemplary approach discussed below is to combine top-k style queries with approximate algorithms for computing the probabilities. When managing imprecisions in data, the most meaningful information lies not in the exact values of the output probabilities, but in the ranking of the answers produced by queries. Thus, the focus can be shifted from computing the output probabilities to finding and ordering the top-k answers. Restricting results of a query to just the first k answers is justified in the context of dealing with imprecisions in data, since here many tuples in the query answer are of very low quality (probability), and users are interested in seeing only the most highly ranked answers. Under this approach, an exemplary novel query evaluation algorithm has been developed for computing the top-k answers, with provable theoretical guarantees that the probabilities are as indicated.

Thus, one problem addressed herein is as follows. Given a structured query language (SQL) query and a number k, it is desired to return to the user the k-highest ranked answers sorted by their output probabilities. To compute the probabilities, Luby and Karp's Monte Carlo (MC) simulation algorithm is used in one exemplary approach; this algorithm can compute an approximation to any desired precision. A naive application of the MC simulation algorithm would be to run it a sufficiently large number of times on each possible query answer, compute the probability of each possible answer with high precision, and then sort the answers and return the top k answers. In contrast, an exemplary alternative algorithm that is more efficient is described below and is called the "multi-simulation (MS) algorithm." The MS algorithm concentrates the simulation steps on the top k answers and only simulates the others a sufficient number of times to ensure that they are not in the top k. Other approaches can be used for eliminating answers that are not in the top k. It is shown that MS is theoretically optimal in a very strong sense; it is within a factor of two of a non-deterministic optimal algorithm, which "magically knows" how many steps or times to simulate each answer, and no other deterministic algorithm can be better. The following text discloses three exemplary embodiments of MS: computing the set of top k answers; computing and sorting the set of top k answers; and an "any time" algorithm, which outputs the answers in the order 1, 2, 3, . . . , k, and which can be stopped at any time. Experiments show that MS gracefully exploits k (the running times are essentially linear in k) and that MS is dramatically more efficient than the naive application of MC noted above.

It must be emphasized that the application of this technology embodied in these three exemplary embodiments is NOT limited to determining the top-rated answers to a query of an imprecise database based on the relative probabilities of the answers. Instead, this approach can more generally be applied to determining a top-rated number of entities from a collection of entities that meet certain requirements, in regard to some criteria other than probability. For this reason, at least some of the claims emphasize this broader applicability. Thus, the terms "entity" (and its plural form) is used as a broad term encompassing almost any type of object, including an answer to a query, and the "criterion" (and its plural form "criteria) is used as a broad term for a score associated with selecting a subset of the entities, encompassing probability as one type of criteria.

Two additional aspects of this novel technology are described below. The first is to complement MS with two optimizations. One optimization pushes some of the probabilistic processing to a query engine, when it is safe to do so. For example, independent probabilities can be multiplied, while disjoint probabilities can be added, and both can be carried out using the SQL engine. Precise conditions under which such computations can be pushed onto the SQL engine are given. The other optimization prunes the number of candidate answers that need to be simulated by computing a lower and an upper bound for each probability. Both optimizations are provably correct, i.e., they preserve the probabilistic semantics of the queries.

The second additional aspect of this technology is to show that by adding SQL views to probabilistic tables, it is possible to obtain a representation formalism that is complete for possible worlds semantics. In this formalism, the database includes some probabilistic tables (similar to those known in the art), and some SQL views over probabilistic and/or deterministic tables. A prerequisite to such a representation system is a query processor that can efficiently evaluate complex SQL queries over probabilistic databases, because such queries arise inevitable when the views are expanded in the user queries. Accordingly, this exemplary complete representation system is a direct application of the query evaluation method described below.

More specifically, one exemplary aspect of this technology is directed to a method for efficiently automatically determining a number of top-rated entities selected from a group of entities to satisfy a condition. The top-rated entities are rated on a criteria that is computed for a set of entities that may satisfy the condition. The method includes the step of determining an initial range of criteria for each entity in the set of entities. Next, a current critical range of criteria is computed, based upon the ranges of criteria that were determined for each entity. A subset of entities is then selected from the set, on which to run further iterative computations to determine a refined range of criteria for each entity of the subset of entities. The selection of entities to be included in the subset is based upon the range of criteria previously determined for the entities. Computation of the current critical range of criteria and selection of the entities from the set on which to run further iterative computations is repeated until a current critical range does not include any portion of a refined range of criteria for any of the entities in the subset. The number of entities that are above the current critical range then comprises the number of top-rated entities. The number of top-rated entities are presented to a user, e.g., by displaying or printing them, or by preserving them in storage for subsequent use. The step of presenting the number of top-rated entities is also intended to encompass providing the number of top-rated entities to another application that uses them as an input.

The step of refining the critical range of criteria to determine the current critical range of criteria can include the steps of setting a lower critical bound for the current critical range of criteria based upon a $top_k$ refined lower bound, determined by running the computations on the entities. In this case, the $top_k$ refined lower bound is a $k^{th}$ largest refined lower bound of the entities. Also, an upper critical bound for the current critical range is based upon a $top_{k+1}$ refined upper bound for the entities, which is determined by running the computations on the entities. For this step, the $top_{k+1}$ refined upper bound is a $k+1^{th}$ largest refined upper bound of the entities.

The method can also include the step of ranking the number of top-rated entities by the range of criteria computed for each.

Another step of the method provides for enabling a user to terminate the iterative repetition of steps (b) and (c) at any time. An ordered set of top-rated entities determined that have been identified up to that time is returned, without regard to any specified number of entities.

The step of selecting the subset of entities for repetitively running the computations can include the steps of selecting each entity for which a lower bound of the refined criteria is less than a critical lower bound of the current critical range of criteria and an upper bound of the refined criteria is greater than a critical upper bound of the current critical range of criteria. If no entity is selected, the method selects each pair of entities, wherein for a first entity of the pair, the lower bound of the refined criteria is less than the critical lower bound, and for the second entity of the pair, the upper bound of the refined criteria is greater than the critical upper bound of the current critical range of criteria. Finally, if no pair of entities is thus selected, the method selects each entity for which a range between the lower bound of the refined criteria and the upper bound of the refined criteria includes corresponding ranges of all other entities.

Another step of the exemplary method calls for initially reducing an extent of the critical range of criteria before iteratively running the computations repetitively on each entity in the subset, by statically evaluating groups of the entities.

A further aspect of this technology is directed to a system that includes a memory in which the group of entities and a plurality of machine executable instructions are stored, a user input for enabling a user to control the system and provide input data, and an output device for presenting information to a user. A processor is coupled to the memory, the user input, and the output device, and executes the machine executable instructions in the memory to carry out a plurality of functions that are generally consistent with the steps of the method discussed above.

Yet other aspects of the technology are defined in regard to an exemplary method and system used in connection with selecting k top rated answers in response to a query of imprecise data, based upon a probability of the possible answers.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 illustrates exemplary schema fragments of Internet Movie Database (IMDB) and Amazon database, and a fuzzy match table;

FIG. 2 illustrates some fuzzy matches in TitleMatch$^p$, where the table stores only the asin and mid values, but the review tile and movie title are included for readability;

FIG. 3 illustrates an exemplary query for retrieving all directors that produced both a highly rated comedy and a low rated drama less than five years apart;

FIG. 4 illustrates exemplary top 5 query answers out of 1415 for the query of FIG. 3;

FIG. 5 is an exemplary result produced by running a query;

Figures 6, 7, 8:
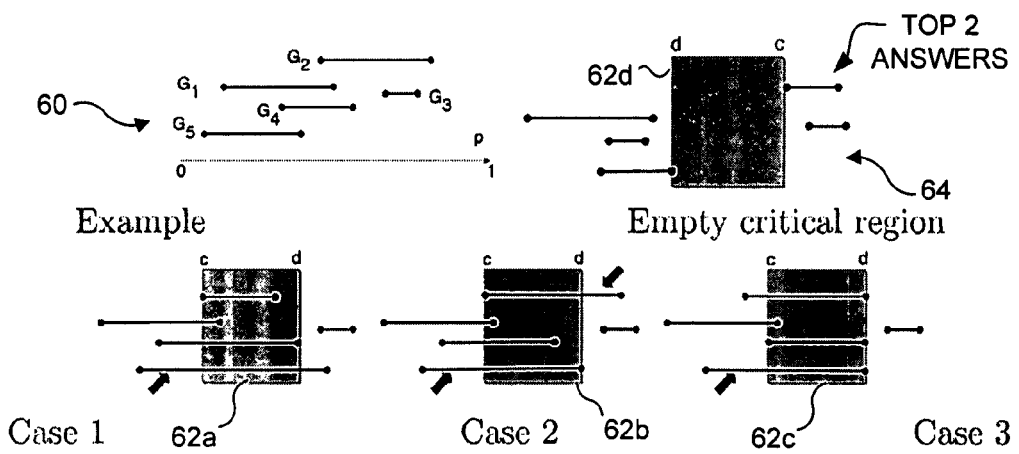
Figure 9A:
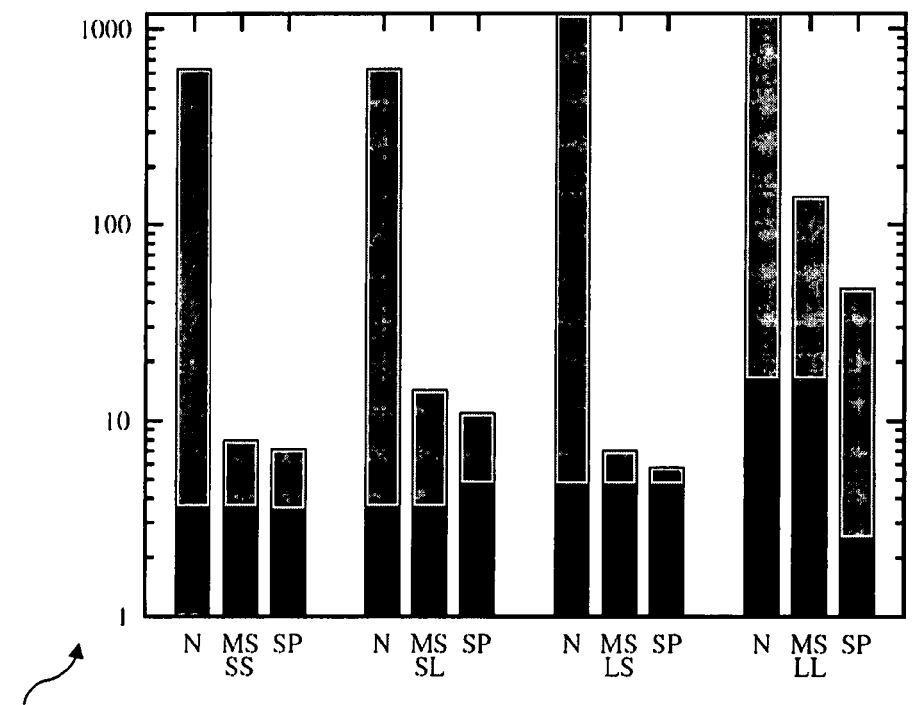
Figure 9B:
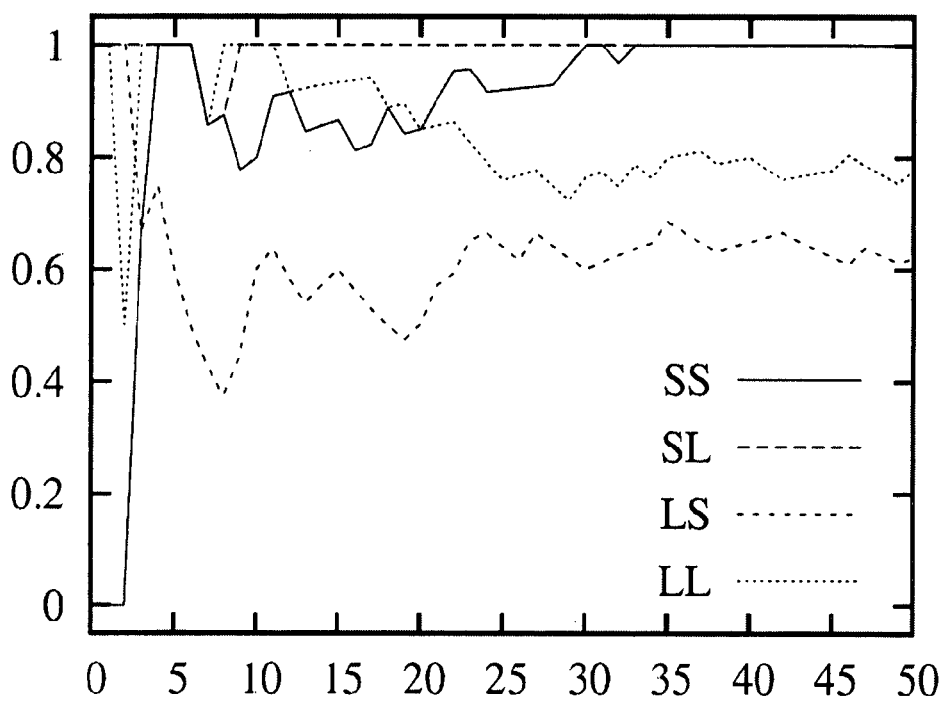
Figure 9C:
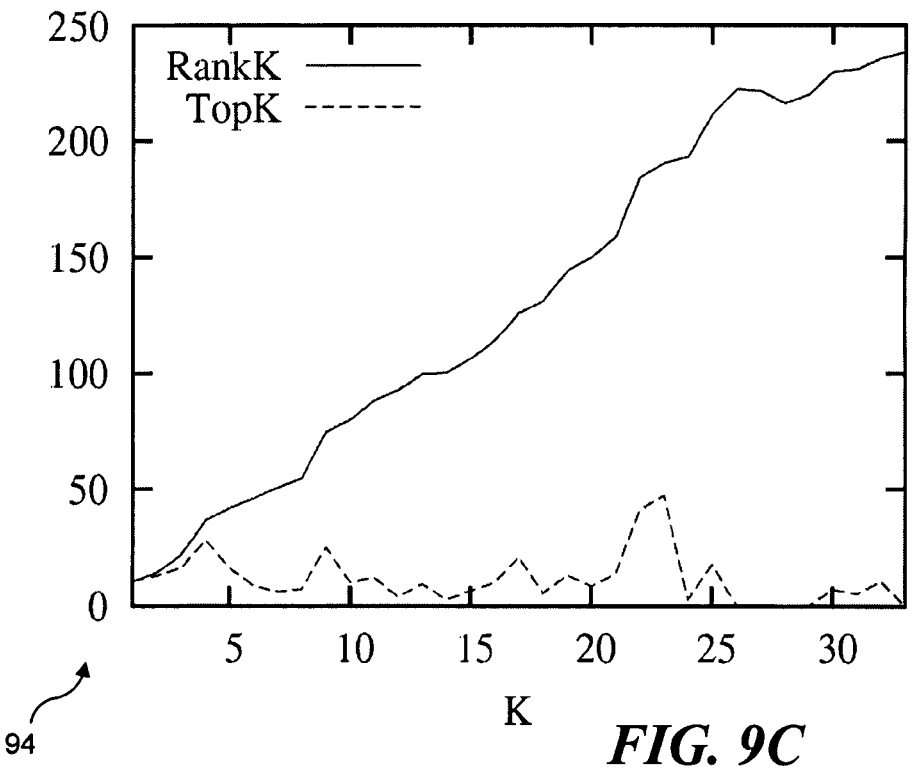
Figure 9D:
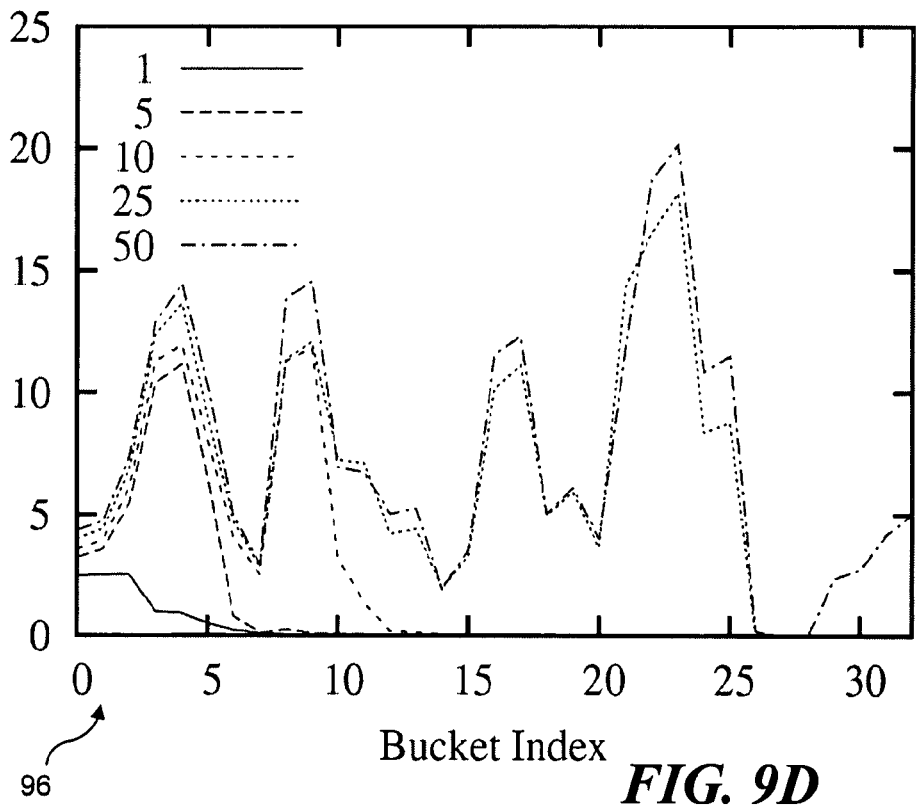
Figure 9E:
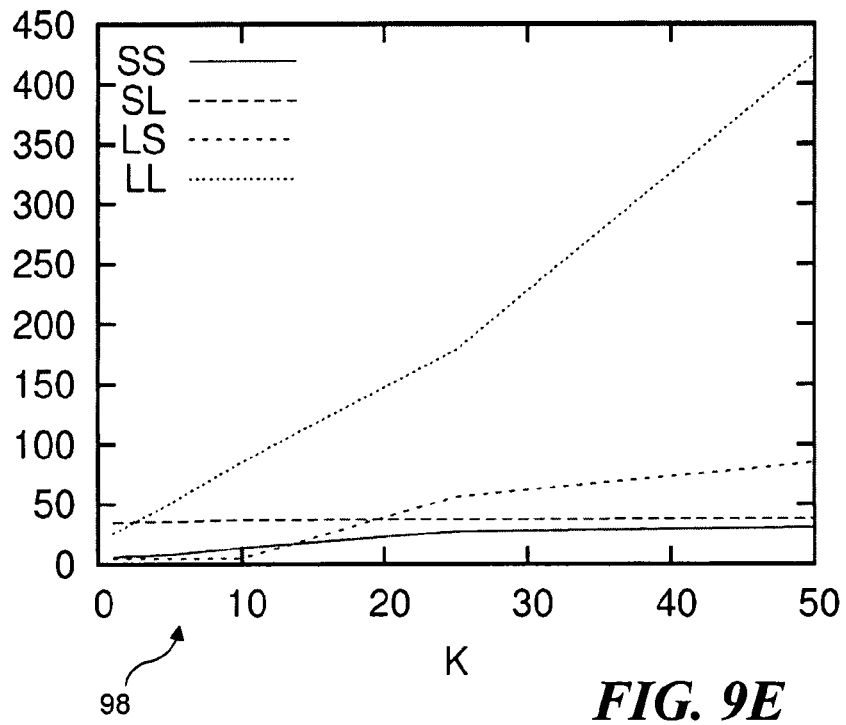
Figure 9F:
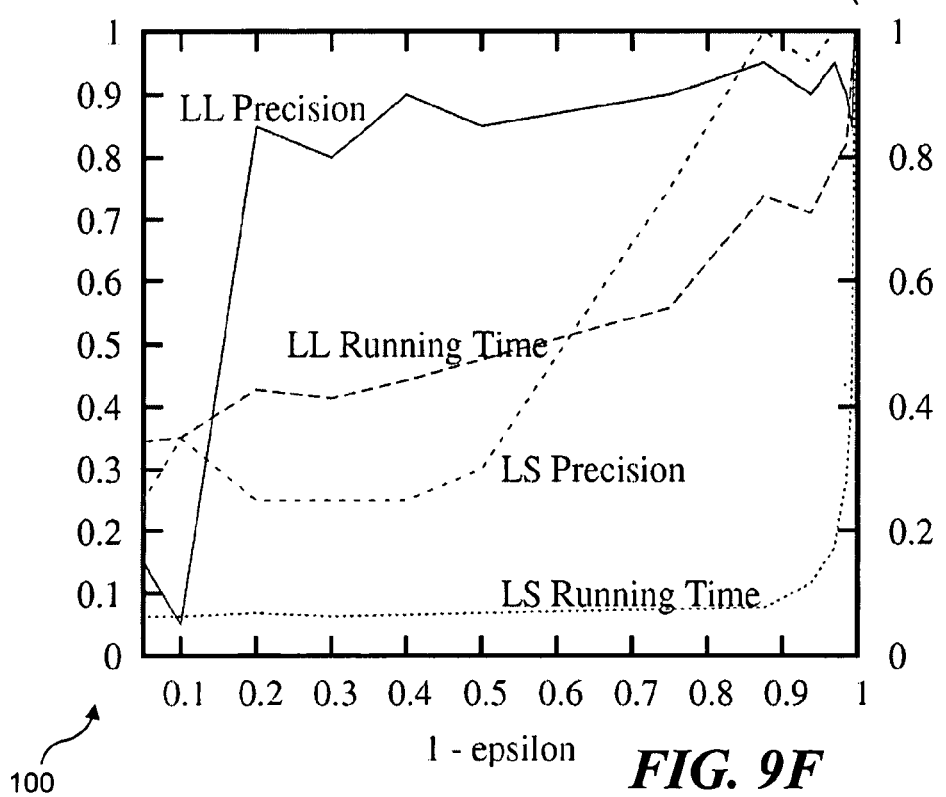
Figure 10:
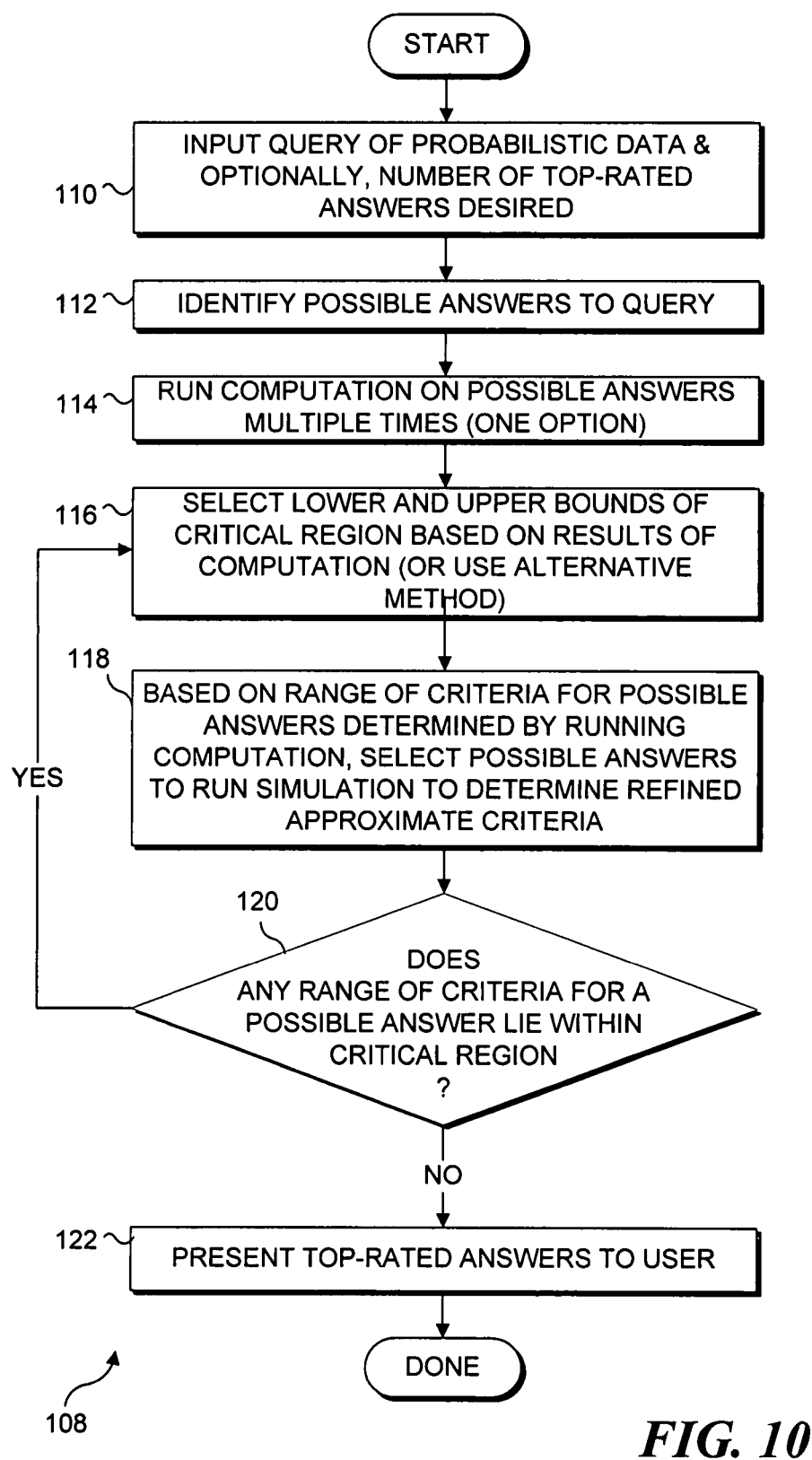
Figure 11:
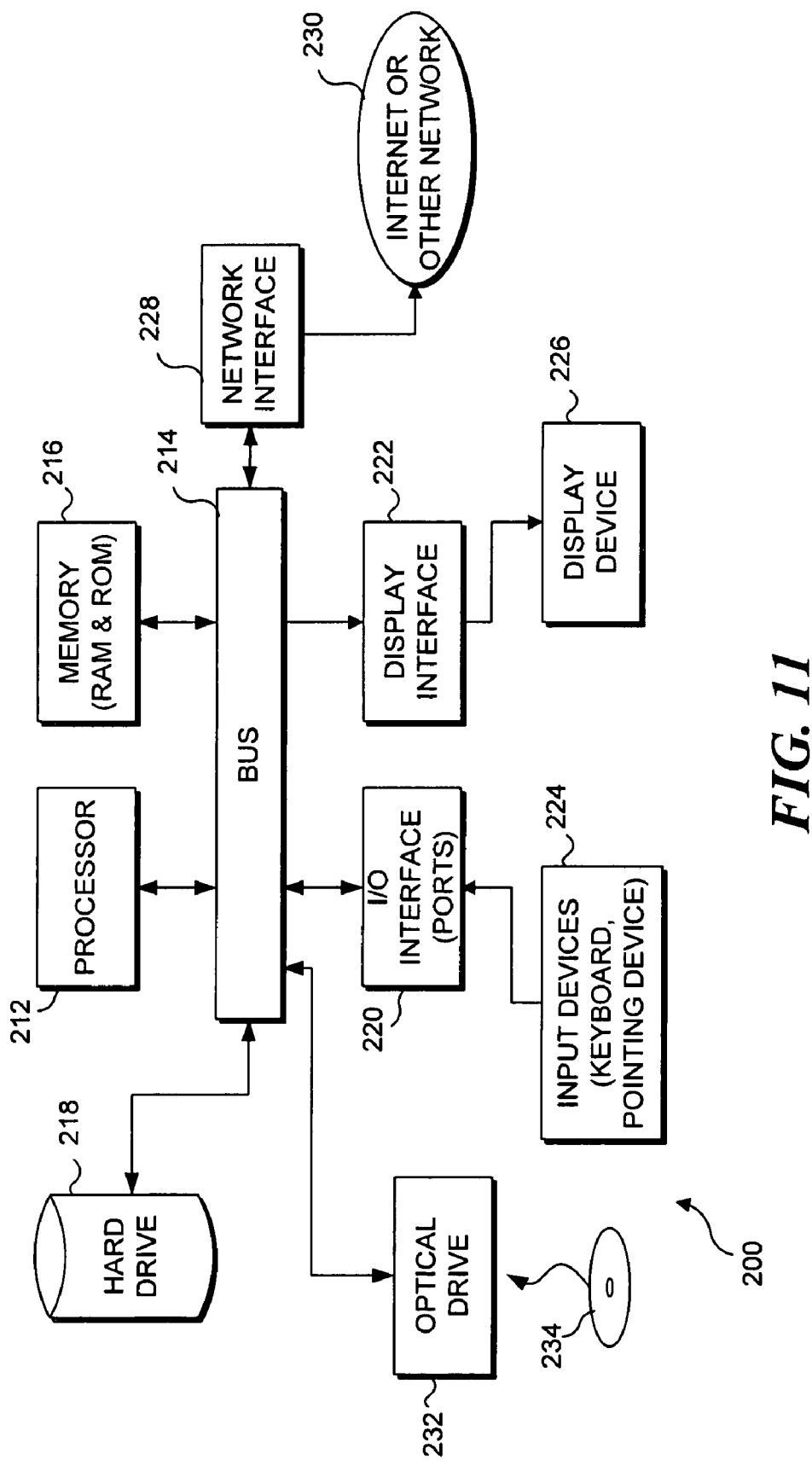

FIG. 6 graphically illustrates three cases for an example using MS, where k equals 2;

FIG. 7 illustrates three exemplary case studies of imprecisions;

FIG. 8 illustrates exemplary query stats without and with a Safe Plan;

FIG. 9A is a graph illustrating running time for three different approaches;

FIG. 9B is a graph illustrating precision/recall for naïve strategies;

FIG. 9C is a graph illustrating a total number of simulation steps for a query SS;

FIG. 9D is a graph illustrating simulation step per bucket for query SS;

FIG. 9E is a graph illustrating the effect of K on running time;

FIG. 9F is a graph illustrating the effect of $\epsilon$ on precision and running time;

FIG. 10 is a flowchart showing exemplary logical steps for determining the top-rated answers in response to a query of probabilistic data; and FIG. 11 is a functional block diagram of an exemplary conventional computing system that is useful for implementing the novel approach described herein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Challenges

Illustrated herein are the challenges faced by query evaluation on probabilistic databases with an application that integrates the Internet Movie Database from imdb.com, with movie reviews from amazon.com; there are over 10 M tuples in the integrated database. A simplified schema 10 is shown in FIG. 1, and it will be used as a running example in the following discussion. Amazon products (DVDs in this case) are identified by a unique Amazon Standard Identification Number, asin, in each entry 12 of schema 10, and each DVD object has several sub-objects, including customer reviews, actors, director, etc. The IMDB schema is self-explanatory and includes entries 14. The value of integrating the two data sources lies in combining the detailed movie data in IMDB with customer ratings in AMZN.

From Imprecisions to Probabilities

One source of imprecision in integrating the two data sources is that their movie titles often don't match, e.g., "Twelve Monkeys" versus "12 Monkeys," or "Who Done it?" versus "The Three Stooges: Who Done it." The problem of detecting when two representations denote the same object has been intensively studied, and is referred to as deduplication, record linkage, or merge-purge. Perfect object matching is sometimes impossible, and when it is possible, it is often very costly, since it requires specialized, domain specific algorithms. The present exemplary approach relies on existing domain independent methods, and changes the way their outputs are used. Currently, all fuzzy match methods use a thresholded similarity function approach, which relies on a threshold value to classify objects into matches and non-matches. This approach is a compromise that can lead to false positives (when the threshold value is too low) or to false negatives (when it is too high). In contrast, in the present exemplary approach, the system retains all similarity scores and handles them as probabilistic data. A similarity score between each pair comprising a movie title and a review title was computed by comparing their sets of 3-grams. This approach resulted in a number p between 0 and 1, which was interpreted as the confidence score and was stored in a table 16 called TitleMatch$^p$.

FIG. 2 shows a very simplified fragment 20 of an exemplary table TitleMatch$^p$, consisting of five tuples $t_1, \ldots, t_5$. Each tuple contains an asin value (a review in the Amazon data) and a mid value (a movie in the IMDB data). The Amazon review with asin=a282 refers to a movie with the title "12 Monkeys," which can be one of three movies in the IMDB database, including either "Twelve Monkeys," or "Twelve Monkeys (1995)," or to "Monk." Thus, only one of the tuples $t_1, t_2, t_3$ can be correct, i.e., they are exclusive, or disjoint, and their probabilities are $p_1=0.4$, $p_2=0.3$, and $p_3=0.013$ respectively. Note that $p_1+p_2+p_3 \leq 1$, which is a necessary condition since the three tuples are exclusive events, and the similarity scores are normalized to enforce this condition. Similarly, the movie review about "Monkey Love" can refer to one of two IMDB movies, with probabilities $p_4=0.35$ and $p_5=0.27$, respectively. It is assumed that any of the three matches for the first review is independent from any of the two matches of the second review. This discussion summarizes how fuzzy object matches can be mapped to probabilities (or to other criteria). Other types of imprecisions are discussed below.

Possible Worlds Semantics

The table TitleMatch$^p$ is only a representation of a probabilistic database. The superscript p indicates that it is a representation, and that it contains explicit probabilities. Its meaning is a probability distribution on possible instances (possible worlds) over a table TitleMatch(asin, mid). A possible instance consists of a subset of the tuples in TitleMatch$^p$ that does not contain two tuples with the same asin, and its probability is computed in a natural fashion. For example, the set of tuples $\{t_2, t_4\}$ is one possible world, and its probability is $P(\{t_2, t_4\})=p_2 p_4=0.3 \times 0.35=0.105$, while the probability of $\{t_2\}$ is $P(\{t_2\})=p_2(1-p_4-p_5)=0.3 \_ 0.48=0.144$. In this example, there are $4*3=12$ possible worlds that can be obtained from $t_1, t_2, t_3, t_4, t_5$. Note that asin is a key in TitleMatch, but is not a key in TitleMatch$^p$, since it is necessary to store multiple possible matches for each asin.

SQL Queries

SQL queries are considered using standard syntax, but with modified semantics. To illustrate, consider the query "find all directors that produced both a highly rated comedy and a low rated drama less than five years apart;" an SQL expression 25 for this query is illustrated in FIG. 3. Since the query is evaluated on a probabilistic database, each of its answers has a confidence score p, as show in FIG. 4, which lists the five answers with the highest probabilities, out of a total of 1415 answers. The semantics of these probabilities are as follows. The probability of the answer "Woody Allen" is the sum of the probabilities of all possible worlds in which "Woody Allen" is an answer to the query. Thus, the probability score represents a confidence that "Woody Allen" is an answer to the query, given the imprecisions in the data. Since the input probabilities were computed using heuristics, there are very little semantics in the actual values of these probabilities; however, the ranking of the results is meaningful, e.g., "Woody Allen" is a more likely answer than "George Cukor," who is a more likely answer than, say, the $1000^{th}$ ranked answer.

Challenges

Query evaluation poses two major challenges. The first is that computing exact output probabilities is computationally hard. The data complexity for the query in FIG. 3 is #P-complete (which can be shown), meaning that any algorithm computing the probabilities essentially needs to exactly iterate through all possible worlds. Previous work on probabilistic databases avoided this issue in several ways. One previous approach required the SQL queries to include all keys in all tables, thus disallowing duplicate elimination. This prior approach rules out the query in FIG. 3, because that query does not include any of the keys of the seven tables in the FROM clause. If all these keys were included in the SELECT clause, then each director in the answer would be listed multiple times—once for each pair of movies that satisfies the criterion. In the example provided, each of the 1415 directors would have occurred on average 234.8 times, which makes it impossible to rank the directors. It has also been shown that probability intervals can be computed instead of exact probabilities. However, unlike Luby and Karp's algorithm, which can approximate the probabilities to an arbitrary precision, the precision in the computation of a probability interval cannot be controlled. In fact, the more complex the query, the wider (i.e., less precise) will be the approximation intervals, since the strategies in this approach have to conservatively account for a wide range of possible correlations between the input probabilities. For example, when combining the (on average) 234.8 different probabilities to compute the probability of a single director, the resulting interval degenerates to [0, 1] for most directors. It is still possible to use this method in order to rank the outputs, (by ordering them based on their interval midpoints) but doing so results in low precision. Another prior approach uses an exponential time algorithm that essentially iterates over all possible worlds that support a given answer, which is again impractical in the present setting. Finally, another approach only considers "safe" queries, while a query in the present approach is not safe. The second challenge is that the number of potential answers for which it is necessary to compute the probabilities is large. In the present example, there are 1415 such answers. Many of them have very low probability, and exist only because of some highly unlikely matches between movies and reviews. Even if the system spends large amounts of time computing all 1415 probabilities precisely, the user is likely to inspect just the first few of them.

The present approach focuses the computation on the top k answers with the highest probabilities. A naive way to find the top k probabilities is to compute all probabilities and then select the top k. Instead, the present approach approximates probabilities only to the degree needed to guarantee that: (a) the top k answers are the correct ones; and, (b) the ranking of these top k answers is correct. In the present example, an approximation algorithm is run for many steps on, for example, the top k=10 answers, in order to identify them and rank them, but only runs a few steps on the remaining (1415−10=1405) answers, and approximates their probabilities only as much as needed to guarantee that they are not in the top 10. This approach has been found to be orders of magnitude more efficient than the naive approach. A major challenge is that the tuples that are in top 10 are not known before their probabilities are determined, and the solution to this problem is one of the key contributions discussed herein.

Limitations

The following discussion is restricted to a data model where probabilities are listed explicitly. For example, if a Person table with salary and age attributes whose values are correlated probability distribution is used, then in the present exemplary model, it is necessary to enumerate explicitly all combinations of salary and age, e.g., (Smith, 20, 1000, 0.3), (Smith, 20, 5000, 0.1), (Smith, 40, 5000, 0.6), which allows for correlated attributes as long as the joint distribution is represented explicitly. In contrast, Bayesian Networks, and their extensions to Probabilistic Relational Models, enable such correlations to be expressed much more concisely. The present exemplary approach also does not handle continuous attribute values, e.g., it cannot handle the case where the attribute temperature has a normal distribution with mean equal to 40.

Probabilistic Databases

A basic probabilistic data model is now introduced and is extended in the discussion that follows.

Possible Worlds: Fix a relational schema S, consisting of relation names $R_1, R_2 \ldots, R_m$, a set of attributes $Attr(R_i)$, and a key $Key(R_i) \subseteq Attr(R_i)$ for each relation name $R_i$, i=1, m. A probabilistic database is defined to be a probability distribution on possible worlds over S.

Definition 1. A probabilistic database over schema S is a pair (W, P) where $W=\{W_1, \ldots, W_n\}$ is a set of database instances over S, and P: W→[0, 1] is a probability distribution.

$$\left(\text{i.e.,} \sum_{j=1,n} P(W_j) = 1\right).$$

Each instance $W_j$ for which $P(W_j)>0$ is called a possible world.

The intuition is that the exact state of the database is uncertain. There are several possible instances, and for each such instance, there is a probability.

Representation Of course, it is impractical to enumerate all possible worlds and their probabilities. A probabilistic database is represented by using a modified schema $S^p$, called a probabilistic schema, which contains explicit probabilities (hence the superscript p). $S^p$ includes modified relation names $R_1^p, \ldots, R_m^p$, such that for each i=1, m: (1) either $R_i^p$ has the same schema as $R_i^p$ (in this case $R_i^p$ is deterministic), or (2) $Attr(R_i^p)=Attr(R_i)\cup\{p\}$, and $Key(R_i^p)=Attr(R_i)$. In the second case, $R_i^p$ is probabilistic, and the following two constraints are imposed on its p attribute: (a) the values are real numbers in [0, 1]; and, (b) for every value $\bar{a}$ of the $Key(R_i)$ attributes, sum $(\Pi_p(\sigma_{Key(R_i)=\bar{a}}(R_i^p))) \leq 1$ The following discussion defines how a database instance $J_p$ over schema $S_p$ represents a probabilistic database over the schema S, denoted $Mod(J_p)$. To simplify the discussion, it will be assumed that S consists of a single relation name, R $(A_1, \ldots, A_m, B_1, \ldots, B_n)$ in notation $R(\bar{A}, \bar{B})$ (here $Key(R)=\{A_1, \ldots, A_m\}=\bar{A}$), and consider an instance $J^p$ of the table $R^p(\bar{A},\bar{B}, p)$. Note that the key in $R^p$ consists of all attributes $\bar{A}, \bar{B}$, not just $\bar{A}$. The possible worlds $W=\{W_1, \ldots, W_n\}$ are defined to consist of all subsets $W_j$ of $\Pi_{\bar{A},\bar{B}}(J^p)$ where the attributes $\bar{A}$ form a key. For each such $W_j$, define its probability $$P(W_j) = \prod_{\bar{a} \in \Pi_{\bar{A}}(J^p)} pw_j(\bar{a}),$$

where $pw_j(\bar{a})$ is defined as follows. If there exists a tuple $(\bar{a}, \bar{b}) \in W_j$ then $pw_j(\bar{a})$ is the unique probability p of that tuple in $J^p$ (i.e., p is such that $(\bar{a},\bar{b},p) \in J^p$). If there is no such tuple, then $pw_j(\bar{a})$ is 1−sum $(\cup_p(\sigma_{\bar{A}=\bar{a}}(J^p)))$.

Definition 2. Let $J^p$ be a database instance over schema $S^p$. Then $Mod(J^p)$ is the probabilistic database (W, P) over the schema S obtained as described above.

Example For a simple illustration, consider the schema $S^p$ in FIG. 1. All tables AMZNReviews, IMDBDirector, ... are deterministic, except for a TitleMatch$^p$(asin, mid, p) 40, which represents possible worlds for TitleMatch(asin, mid). This exemplary instance of TitleMatch$^p$(same as FIG. 2) and its 12 possible worlds 50 are illustrated in FIG. 5. The restrictions are:

$p_1, \ldots, p_5 \in [0,1], p_1+p_2+p_3 \leq 1, p_4+p_5 \leq 1$.

DNF Formulas over Tuples Let (W, P) be a probabilistic database and let $t_1, t_2, \ldots$ be all the tuples in all possible worlds. Each tuple is interpreted as a Boolean propositional variable, and each possible world W as a truth assignment to these propositional variables, as follows: $t_i$=true if $t_i \in W$, and $t_i$=false if $t_i \notin W$. Consider now a DNF formula E over tuples: clearly E is true in some worlds and false in others. Define the probability of E, P(E), to be the sum of P(W) for all worlds W where E is true. Continuing the example, the expression E= $(t_1 \wedge t_5) \vee t_2$ is true in the possible worlds $W_3$, $W_7$, $W_{10}$, $W_{11}$, and its probability is thus P(E)=P($W_3$)+P($W_7$)+P($W_{10}$)+P($W_{11}$).

Queries

Syntax Consider SQL queries over the schema S:

q=TOP k $$\text{SELECT } \bar{B}, agg_1(A_1), agg_2(A_2), \quad (1)$$

FROM $\bar{R}$ WHERE C GROUP-BY $\bar{B}$

The aggregate operators can be sum, count (which is sum (1)), min, and max; avg is not supported.

Semantics The meaning of the query q is now defined on a probabilistic database ($\{W_1, \ldots, W_n\}$, P). Intuitively, the answer to the query is a table like the following example:

| $B_1$ | $B_2$ | ... | $agg_2(A_1)$ | $agg_2(A_2)$ | ... | p |
|---|---|---|---|---|---|---|
| $b_{11}$ | $b_{12}$ | ... | $e_{11}$ | $e_{12}$ | ... | $p_1$ |
| $b_{21}$ | $b_{22}$ | ... | $e_{21}$ | $e_{22}$ | ... | $p_2$ |
| ... | ... | ... | ... | ... | ... | ... |

Each answer is of the form ($\bar{b}$, $\bar{e}$, p) and consists of: (1) a tuple $\bar{b}$ of the group-by attributes (the meaning is that $\bar{b}$ occurs as answer to q in at least one possible world); (2) a tuple $\bar{e}$ of the aggregate attributes (the meaning is that these are the expected values of those aggregates over all possible worlds that return $\bar{b}$); and (3) the probability p that $\bar{b}$ is an answer. For a simple illustration, the query in FIG. 3 is an instance of (1). It has no aggregates (hence the GROUP-BY becomes DISTINCT), and its answers 30 are shown in FIG. 4.

Query semantics are defined formally next. Under standard SQL semantics, the answers to q on a possible world $W_j$ are tuples of the form ($\bar{b}$, $\bar{a}$), where $\bar{b}$ are the values of the $\bar{B}$ attributes and $\bar{a}$ are aggregate values. Given $\bar{b}$, denote $C_{\bar{b}}(W_j)$, and the predicate "$q(W_j)$ contains at least one answer of the form ($\bar{b}$, $\bar{a}$)"; and denote $F_{\bar{b}}(W_j)$ the function that returns the unique value $\bar{a}$ for which ($\bar{b}$, $\bar{a}$) is in $q(W_j)$ when $C_{\bar{b}}(W_j)$ is true, and which is undefined when $C_{\bar{b}}(W_j)$ is false. Recall the standard definitions of the probability of a predicate, and the conditional expected value of a function:

$$P(C_{\bar{b}}) = \sum_{j | C_{\bar{b}}(W_j) = true} P(W_j)$$

$$E(F_{\bar{b}} | C_{\bar{b}}) = \sum_{j | C_{\bar{b}}(w_j) = true} F_{\bar{b}}(W_j) P(W_j) / P(C_{\bar{b}})$$

Definition 3. For a probabilistic db (W,P), define:

$q(W,P) = \{(\bar{b},\bar{e},p) | \exists W_j C_{\bar{b}}(W), e = E(F_{\bar{b}}|C_{\bar{b}}), p = P(C_{\bar{b}})\}$ For a representation $J^p$, define $q(J^p) = q(Mod(J^p))$.

Finally, in the context of a top-k query, return only the tuples ($\bar{b},\bar{e},p$) with the k highest probabilities p.

From Queries to DNF Formulas

The present exemplary approach to query evaluation $q(J^p)$ computes probabilities of certain DNF formulas constructed by running a modified SQL query, called expanded query qe, over the representation $J^p$; qe is derived from q by replacing the SELECT clause with * and removing the GROUP BY clause.

qe=SELECT*FROM $\bar{R}$ WHERE C where $\bar{R}=R_1, \ldots, R_m$ and C are the same as in Eq. (1). Evaluate qe in the database engine, over the instance $J^p$, and obtain a set of answers ET. Each tuple t∈ET has the form t= ($t_1, \ldots, t_m$), where $t_1 \in R_1^p, \ldots, t_m \in R_m^p$. Define the following Boolean expression associated to t:

$$t.E = t_1 \hat{} t_2 \hat{} \ldots \hat{} t_m. \quad (2)$$

It is possible to compute P(t.E) by first eliminating duplicate tuples, then multiplying their probabilities (unless two tuples are exclusive, in which case P(t.E)=0).

Next, partition ET by the GROUP-BY attributes $\bar{B}$: ET=$G_1 \cup G_2 \cup \ldots \cup G_n$. For each group G∈$\{G_1, \ldots, G_n\}$, define the following DNF Boolean expression:

$$G \cdot E = \bigvee_{t \in G} t \cdot E. \quad (3)$$

It has been shown that computing the probability P(G.E) of a DNF formula like Eq. (3) is #P-complete in general. For a group G, denote G.$\bar{B}$ the tuple $\bar{b}$=t.$\bar{B}$ for some t∈G (it is independent on the choice of t∈G). The following theorem can then be proved:

Theorem 1. $q(J^p)$ consists of all tuples ($\bar{b}$, $\bar{e}$, p) such that:

$\bar{b} = G \cdot \bar{B}$ for some $G \in \{G_1, \ldots, G_n\}$ $p = P(G \cdot E)$ $e_i = \sum_{t \in G} P(t \cdot E) * t \cdot A_i / p$ if $AGG_i = sum(A_i)$ $ei = \sum_{t \in G} \left(1 - P\left(\bigvee_{t' \in G | t' \cdot A_i \geq t \cdot A_i} t' \cdot E\right)\right) * t \cdot A_i / p$ if $AGG_i = max(A_i)$.

The above Definition of q(W, P) gives the query's semantics in terms of possible worlds. Theorem 1 shows how to rephrase it in terms of DNF expressions over tuples.

Example Consider the query q in FIG. 3. The extended query is obtained by removing the group-by clause (removing DISTINCT) and replacing the SELECT clause with *:

SELECT*FROM ( . . . same 7 tables . . . ) WHERE . . .

Thus, each answer returned by qe contains the seven tuple variables defined in the FROM clause: (a, b, $ax^p$, $by^p$, x, y, d). Of these only $ax^p$, $by^p$ are probabilistic tuples, and the superscript p was added to indicate that they range over TitleMatch$^p$. Thus, each row t returned by qe defines a Boolean formula $t.E = ax^{p \hat{}} by^p$, and its probability P(t.E) is given by the following algorithm.

The Luby-Karp algorithm is used for computing the probability of a DNF formula G.E=$\bigvee_i t_i.E$ (Eq. (3)), where each $t_i.E$ is a disjunct (Eq. (2)), as follows:

fix an order on the disjuncts: $t_1, t_2, \ldots, t_m$

C:=0 repeat

Choose randomly one disjunct $t_i \in G$

Choose randomly a truth assignment such that $t_i.E$=true if fo rall j<i $t_j.E$=false, then C:=C+1 until: N times return $\tilde{p}$=C/N $P(t.E) = ax^P.p$ if $ax^P.asin = by^P.asin \wedge ax^P.mid = by^P.mid$
$P(t.E) = 0$ if $ax^P.asin = by^P.asin \wedge ax^P.mid \neq by^P.mid$
$P(t.E) = ax^P.p * by^P.p$ if $ax^P.asin \neq by^P.asin \wedge ax^P.mid \neq by^P.mid$ Next, group the rows by their directors, and for each group $G = \{(ax_1^P, by_1^P), \ldots, (ax_m^P, by_m^P)\}$, construct the DNF formula:

$$G.E = ax_1^P \wedge by_1^P \vee \ldots \vee ax_m^P \wedge bx_m^P.$$

The director's probability is given by $P(G.E)$ and is a 2DNF, but computing its probability is still #P-complete.

In summary, the query evaluation problem has been rephrased to the problem of evaluating, for each query answer, the probability of one or more DNF formulas: $p = P(G.E)$, and any DNF formula occurring in the expression for max (and similarly for min). The following discussion focuses on computing $P(G.E)$, where $G.E$ is given by Eq. (3).

Monte Carlo Simulation A Monte Carlo algorithm repeatedly chooses at random a possible world, and computes the truth value of the Boolean expression $G.E$ (Eq. (3)); the probability $p = P(G.E)$ is approximated by the frequency $\tilde{p}$ with which $G.E$ was true. Luby and Karp have described the variant shown above, which has better guarantees than a naive MC. For the present purposes, the details of the Luby and Karp algorithm are not important. What is important is that, after running for N steps, the algorithm guarantees with high probability that p is in some interval [a, b], whose width shrinks as N increases. Formally:

Theorem 2. Set $\delta > 0$ and define $\epsilon = \sqrt{4m\log(2/\delta)/N}$, where $m = |G|$ represents the number of tuples in the group G (i.e., number of disjuncts in the DNF formula), and N is the number of steps executed by the Luby and Karp algorithm. Let $a = \tilde{p} - \epsilon$ and $b = \tilde{p} + \epsilon$. Then, the value p belongs to [a, b] with probability $\geq 1 - \delta$, i.e.:

$$P(p \in [a,b]) > 1 - \delta. \qquad (4)$$

Top-k Query Evaluation

The following describes an exemplary algorithm used in the present approach. A query q is given, as in Eq. (1), and an instance $J^P$ is stored in an SQL database engine. The task is to compute the top k answers in $q(J^P)$. The evaluation has two parts, including: (1) evaluating the extended SQL query qe in the engine and grouping the answer tuples; and, (2) running a Monte-Carlo simulation on each group in the middleware to compute the probabilities, and then returning the top k probabilities.

Multi-Simulation (MS)

The problem is modeled as follows. Given a set $G = \{G_1, \ldots, G_n\}$ of n objects, with unknown probabilities $p_1, \ldots, p_n$, and a number $k \leq n$, the goal is to find a set of k objects with the highest probabilities, denoted $TopK \subseteq G$. An exemplary method for sorting this set is discussed below. The probabilities of the objects are observed by means of a simulation algorithm that, after running N steps on an object G, returns an approximation interval $[a^N, b^N]$ for its probability p, with $a^N < b^N$ (it is assumed that $a^N = b^N$ can never happen). The following four assumptions are made about the simulation algorithm and about the unknown probabilities:

Convergence: $\lim_{N \to \infty} a^N = \lim_{N \to \infty} b^N$.
Precision: $\forall N. p \in [a^N, b^N]$.
Progress: $\forall N. [a^{N+1}, b^{N+1}] \subseteq [a^N, b^N]$.
Separation: $\forall i \neq j, p_i \neq p_j$.

By the separation assumption, TopK has a unique solution, i.e., there are no ties, and by the other three assumptions, the solution can be found naively by a round robin algorithm. In the present setting, each object G is a group of tuples, and its probability is $p = P(G.E)$ (Eq. (3)). The Luby-Karp simulation algorithm is used. Only the first assumption holds strictly (convergence). A method for addressing the other three is discussed below.

Intuition Any algorithm that computes TopK can only do so by running simulations on the objects. The Luby-Karp algorithm simulates the intervals: $[a_1, b_1] = [a_2, b_2] = \ldots = [a_n, b_n] = [0, 1]$, then repeatedly chooses to simulate some $G_i$ for one step. At each point in the execution, object $G_i$ has been simulated $N_i$ steps, and thus, its interval is $[a_i^{N_i}, b_i^{N_i}] = [a_i, b_i]$ (the superscript is omitted when it is clear). The total number of steps over all groups is $$N = \sum_{i=1}^{n} N_i.$$

Consider a top left portion 60 of FIG. 6, where k=2. Here each of the five groups have already been simulated for awhile. Clearly, $G_3$ is in the top 2 (it may be dominated only by $G_2$), although it is not known if it is first or second. However, it is unclear what other object is in the top 2: it might be $G_1$, $G_2$, or $G_4$. It is also certain that $G_5$ is not among the top 2 (it is below $G_2$, $G_3$).

Given two intervals $[a_i, b_i]$, $[a_j, b_j]$, if $b_i \leq a_j$, then it is evident that the first is below, and the second is above. It is also apparent that the two intervals are separated. In this case, it is clear that $p_i < p_j$ (even if $b_i = a_j$, due to the "separation" assumption). It is said that the set of n intervals is k-separated if there exists a set $T \subseteq G$ of exactly k intervals, such that any interval in T is above any interval that is not in T. Any algorithm searching for the TopK must simulate the intervals until it finds a k-separation (otherwise, it can be shown that TopK is not uniquely determined). In that case, the algorithm produces an output TopK=T. The cost of the algorithm is the number of steps N at its termination.

The golden standard in this exemplary approach is the following nondeterministic algorithm, OPT, which is obviously optimal. OPT "knows" exactly how many steps to simulate $G_i$, namely $N_i^{opt}$ steps, such that the following holds: (a) the intervals $[a_1^{N_1^{opt}}, b_1^{N_1^{opt}}], \ldots, [a_n^{N_n^{opt}}, b_n^{N_n^{opt}}]$ are k-separated; and, (b) the sum $$N^{opt} = \sum_i N_i^{opt}$$

is minimal. When there are multiple optimal solutions, OPT chooses one arbitrarily. Clearly, such an oracle algorithm cannot be implemented in practice. The goal is to derive a deterministic algorithm that comes close to OPT.

Example To understand the difficulties of this task, consider two objects $G_1$, $G_2$ and k=1 with probabilities $p_1 < p_2$, and assume that the current intervals (say, after simulating both $G_1$ and $G_2$ for one step) are $[a_1, b_1]$, $[a_2, b_2]$, such that $a_1 = p_1 < a_2 < b_1 < p_2 = b_2$. The correct top-1 answer is $G_2$, but this fact is not known until all answers have been separated. All that is known is that $p_1 \in [a_1, b_1]$, $p_2 \in [a_2, b_2]$, and it is still possible that $p_2 < p_1$. Suppose it is decided to repeatedly simulate only $G_2$. This approach clearly cannot be optimal. For example, $G_2$ may require a very large number of simulation steps before $a_2$ increases above $b_1$, while $G_1$ may take only one simulation step to decrease $b_1$ below $a_2$. Thus, by betting only on $G_2$, the approach may perform arbitrarily worse than OPT, which would know to choose $G_1$ to simulate. Symmetrically, if only $G_1$ is selected, then there are cases when the result will be much worse than OPT.

Round robin seems a more reasonable strategy, i.e., a decision to simulate alternatively $G_1$ and $G_2$. The cost is twice that of OPT, in the following case. For N steps $a_2$ and $b_1$, move very little, such that their relative order remains unchanged, $a_1 < a_2 < b_1 < b_2$. Then, at step N+1, $b_1$ decreases dramatically, changing the order to $a_1 < b_1 < a_2 < b_2$. Round robin finishes in 2N+1 steps. The N steps used to simulate $G_2$ were wasted, since the changes in $a_2$ were tiny and made no difference. Here, OPT chooses to simulate only $G_1$, and its cost is N+1, which is almost half of round robin. In fact, no deterministic algorithm can be better than twice the cost of OPT. However, round robin is not always a good algorithm. Sometimes round robin can perform much worse than OPT. Consider n objects $G_1, \ldots, G_n$ and k=1. Round robin may perform n times worse than OPT, since there are cases in which (as before), choosing the right object on which to bet exclusively is optimal, while round robin wastes simulation steps on all the n objects, and its cost is then: $n \sqcup N^{opt}$.

Notations and definitions Given n non-negative numbers $x_1, x_2, \ldots, x_n$, not necessarily distinct, define $\mathrm{top}_k(x_1, \ldots, x_n)$ to be the k's largest value. Formally, given some permutation such that $x_{i1} \geq x_{i2} \geq \ldots \geq x_{in}$, $\mathrm{top}_k$ is defined to be $x_{ik}$, set $\mathrm{top}_{n+1}=0$.

Definition 4. The critical region, top objects, and bottom objects are:

$$(c, d) = (\mathrm{top}_k(a_1, \ldots, a_n), \mathrm{top}_{k+1}(b_1, \ldots, b_n)) \quad (5)$$

$$T = \{G_i \mid d \leq a_i\}$$

$$B = \{G_i \mid b_i \leq c\}$$

It is possible to check that $B \cap \mathrm{TopK}=0$; and $T \subseteq \mathrm{TopK}$, e.g., $b_i \leq c$ implies (by definition of c) that there are k intervals $[a_j, b_j]$ above $[a_i, b_i]$, which proves the first claim. FIG. 6 illustrates four critical regions 62a-62d.

The important property of a critical region is that the intervals have a k-separation if the critical region is empty, i.e., $c \leq d$ (proof is omitted), in which case it is possible to return TopK=T, which is illustrated in an upper right portion 64 of FIG. 6, where the top two objects are clearly those to the right of the critical region. It is assumed therefore that c<d in the remainder of this discussion. Call an object $G_i$ a crosser if $[a_i, b_i]$ contains the critical region, i.e., $a_i \leq c$, $d \leq b_i$. There are always at least two crossers. Indeed, there are k+1 intervals $[a_i, b_i]$ such that $d \leq b_i$, and at most, k−1 of them may satisfy $c < a_i$. Hence, the others (at least two) satisfy $a_i \leq c$, and are crossers. Given a crosser $[a_i, b_i]$, it is called an upper crosser if $d < b_i$, a lower crosser if $a_i < c$, and a double crosser if both conditions are true.

At each step, an algorithm used in this exemplary approach picks one or two intervals to simulate, according to three cases (see FIG. 6). First, it tries a double crosser $[a_i, b_i]$; if there is none, it then tries to find an upper crosser, and a lower crosser pair. If none exists, then it means that either all crossers have the same left endpoint $a_i = c$, or all have the same right endpoint $d = b_i$. In either case, there exists a maximal crosser, i.e., one that contains all other crossers. The algorithm then picks one and simulates it (there may be several, since intervals may be equal). After each iteration it re-computes the critical region. When the critical region becomes empty, the algorithm stops and returns the set T of intervals above the critical region.

Based on the discussion above, the algorithm is clearly correct, i.e., it returns TopK when it terminates. From the convergence assumption, it follows that the algorithm terminates.

The MultiSimulation (MS) Algorithm

MS TopK(G,k):/*G={$G_1$, . . . , $G_n$}*/Let
[$a_1$, $b_1$]= . . . =[$a_n$, $b_n$]=[0,1],(c,d)=(0,1)

while $c \leq d$ do
   Case 1: exists a double crosser (see critical region 62a); simulate it one step
   Case 2: exists an upper crosser and a lower crosser (see critical region 62b); simulate both one step
   Case 3: otherwise, pick a maximal crosser (see critical region 62c), simulate it one step
   Update (c, d) using Eq. (5)
end while
return TopK=T={$G_i | d \leq a_i$}.

Analysis It can now be shown that the algorithm is optimal within a factor of two of OPT; and, moreover, it can be shown that no deterministic algorithm can be better. At any point during the algorithm's execution, an interval $[a_i, b_i]$ has slack if $N_i < N_i^{opt}$. If it has slack, then the algorithm can safely simulate it without doing worse than OPT.

Lemma. Let $[a_i, b_i]$ be a crosser. Then, in all cases below, $[a_i, b_i]$ has slack:

(1) If it is an upper crosser and is not in the top k.
(2) If it is a lower crosser and is in the top k.
(3) If it is a double crosser.
(4) If it contains all crossers (i.e., it is a maximal crosser).

Proof To see (1), note that OPT must find k intervals above i; but since $[a_i^N, b_i^N]$ is an upper crosser, there are at most k−1 $b_j^N$ terms, such that $b_j^{Nj} > b_i^{Ni}$; hence, OPT can find at most k−1 intervals (namely the same ones, at most) that are above $b_i^{Ni}$, i.e., $a_j^{Nj^{opt}} > b_i^{Nopt}$, because $a_j^{Nj^{opt}} < b_j^{Nj}$ (due to the progress assumption). It follows that OPT must simulate i at least one more step than $N_i$, to bring $b_i^{Nj^{opt}}$ below $b_i^{Ni}$ in order to separate it from the top k. Cases (2) and (3) are similar. To prove case (4), it is assumed that the interval i is in TopK. The other case is symmetric. Consider the k+1 intervals that have $b_j \geq d$. At least one interval, say $[a_j, b_j]$, must not be in TopK, and OPT must separate them by proving that $[a_j, b_j]$ is below $[a_i, b_i]$. But $a_i \leq a_j$ because either $[a_j, b_j]$ is included in $[a_i, b_i]$, or $[a_j, b_j]$ is not a crosser (hence $a_i \leq c \leq a_j$). Thus, to separate them, OPT must either reduce $[a_j, b_j]$ to a point or further simulate $[a_i, b_i]$. But since it was assumed that an MC algorithm cannot return a point interval (i.e., $a^N < b^N$ for all 1), OPT must simulate $[a_i, b_i]$.

Theorem 3. (1) The cost of algorithm MS_TopK is $< 2N^{opt}$. (2) For any deterministic algorithm, computing the top k and for any c<2, there exists an instance on which its cost is $\geq cN^{opt}$.

Proof The main idea for (2) of Theorem 3 is discussed above, but its proof is not provided. To prove part (1) of Theorem 3, notice that at each step the algorithm simulates one or two intervals. It suffices to prove that at least one of them has slack. (which shows that the cost is $\leq 2N^{opt}$; to prove $<2N^{opt}$, notice that at least one iteration simulates a single interval, with slack.) There are three cases. First, a double crosser is simulated and clearly has slack. Second, an upper and a lower crosser are simulated. In order for both not to have slack, one must be in the top k and the other is not in the top k; but in that case, OPT must simulate at least one of them, since they are not yet separated. Accordingly, one of them does have slack after all. Third, there are only upper or only lower crossers, and the largest one is simulated and has been shown to also have slack.

Corollary Let A be any deterministic algorithm for finding TopK. Then (a) on any instance, the cost of MS_TopK is at most twice the cost of A; and, (b) for any c<1, there exists an instance where the cost of A is greater than c times the cost of MS_TopK.

Discussion

Variations and Extensions In answering a query, there is a need to compute the top k answers and to sort them. The following variation of MS, which is called MS_RankK, does this. First, the top k, $T_k$=MS_TopK (G, k) is computed. Next, the following sets are computed, in the indicated sequence:

$$T_{k-1} = \text{MS\_TopK}_{ni}(T_k, k-1)$$
$$T_{k-2} = \text{MS\_TopK}_{ni}(T_{k-1}, k-2)$$
$$\ldots$$
$$T_1 = \text{MS\_TopK}_{ni}(T_2, 1)$$

At each step, a set $T_j$ of the top j answers has been set, and the top j−1 has been computed, which also identifies the j'th ranked object. Thus, all top k objects are identified, in reverse order. Here, MS_TopK$_{ni}$ denotes the algorithm MS_TopK without the first line, i.e., it does not initialize the intervals $[a_i,b_i]$, but continues from where the previous MS algorithm left off. This algorithm is also optimal, but the proof is omitted herein.

The second variation is an any-time algorithm, which computes and returns the top answers in order, without knowing k. The user can stop any time. The algorithm starts by identifying the top element, $T_1$=MS_TopK(G,1). Then it finds the remaining groups in decreasing order: $T_{j+1}$=MS_TopK($B_j$,1), where $B_j$=G−($T_1 \cup \ldots \cup T_j$). Note that for k>1, this algorithm is not optimal in finding the top k elements; its advantage is in its any-time nature. Also, it prevents the semi-join optimization discussed below, which requires knowledge of k.

Revisiting the Assumptions Precision holds for any MC algorithm, but only in a probabilistic sense. For example, after running the Luby-Karp algorithm for N steps, P (p∈[$a^N$, $b^N$])>1−$\delta_1$. The choice of the confidence $\delta_1$ affects the convergence rate: $b^n - a^n = 2\sqrt{4m\log(2/\delta_1)/N}$, where m is the size of the group. In this context, the user chooses a global parameter δ and requires that all n groups be precise with confidence δ. Assuming equal confidences, the system sets $\delta_1$ for each group to δ/n, since it implies $(1-\delta_1)^n \geq 1-\delta$. Still, since it appears under the log parameter, very small values can be chosen for δ without significantly affecting the running time (N), and precision holds for all practical purposes. The separation assumption is more problematic, since in practice, probabilities are often equal or very close to each other. Here, a second parameter ϵ>0 is relied on. When the critical region becomes less than ϵ, the process stops and ranks the uncertain groups based on the midpoints of their intervals. Progress as stated, does not hold for the Monte Carlo simulation technique. Lastly, progress is used to make the statement that OPT's intervals must be contained in the intervals seen. Observe that for any interval for which precision holds, a weaker variant of progress suffices ∀N, ∃ infinitely many N'>N[$a^{N'}$, $b^{N'}$]⊆[$a^N$, $b^N$]. Since the limit exists (by the convergence assumption), this statement is implied. By choosing a appropriately, a constant number of errors with high probability is ensured. Importantly, these weaker assumptions are satisfied, as discussed above. The choice of ϵ also affects running time and precision/recall. The system's sensitivity on δ and ϵ is discussed below.

Finally, note that the restriction that the intervals never collapse (i.e., $a^N < b^N$ for all N) is important. This restriction is always true in practice (for any MC algorithm). As a pure theoretical observation, it is noted that without this assumption, the proof of the above Lemma, case (4) fails and, in fact, no deterministic algorithm can be within a constant factor of OPT. Consider searching for the top k=1 of n objects; all n intervals start from the initial configuration [0, 1]. OPT picks the winning object, whose interval, after one simulation step, collapses to [1,1]. OPT finishes in one step, while any deterministic algorithm must touch all n intervals at least once.

Further Considerations It may be questioned whether the adversarial model in which intervals may shrink at arbitrary, unpredictable rates is too strong. In theory it may be possible to design an algorithm that finds TopK by exploiting the specific rates at which the intervals shrink, as discussed above. However, note that this approach will result in at most a factor of two improvement over the MS algorithm, due to the Corollary discussed above.

Optimizations

Two optimizations are presented herein for discussion. The first reduces the number of groups to be simulated using a simple pruning technique, the second reduces the sizes of the groups by pushing more of the processing from the middleware to the engine. Both techniques are provably correct in that they are guaranteed to preserve the query's semantics.

Pruning The following are two simple upper and lower bounds for the probability of a group G:

$$\max_{i=1}^{m} P(t_i \cdot E) \leq P(V_{i=1}^{m} t_i \cdot E) \leq \sum_{i=1}^{m} P(t_i \cdot E).$$

These upper and lower bounds can be easily computed and the critical region can then be computed using Eq. (5) and some groups to be pruned before even starting MS. As an improvement, when there are no pairs of disjoint tuples in the group (which is a condition that can be checked statically), then the upper bound can be tightened to $1-\Pi_i(1-P(t_i.E))$.

Safe Subqueries Sometimes, the task of determining the probabilities of each result can be pushed to the query engine by multiplying probabilities (when the tuples are independent) or by adding them (when the tuples are disjoint). This task can be achieved by running an SQL query, over a subset $\bar{R}' \subseteq \bar{R}$ of the tables in the original query q, like the following (here $\bar{R}'$=R1, R2, R2):

$sq$=SELECT$\bar{B}'$,AGG($R1^p.p.R2^p.p*R3^p$) as $p$ FROM $R1^p$, $R2^p$, $R3^p$ WHERE C GROUP-BY $\bar{B}'$.

Where AGG is either of the terms sum or prod 1 1, as follows:

$$\text{sum}(p_1, \ldots, p_m) = \sum_i p_i$$

$$\text{prod\_1\_1}(p_1, \ldots, p_m) = 1 - \prod_i (1-p_i).$$

The optimization works as follows. Given the query q (Eq. (1)), choose a subset of its tables $\bar{R}' \subseteq \bar{R}$, and some set of attributes $\bar{B}'$ (which must include all attributes on which the relations $\bar{R}'$ join with the other relations). Then, construct a subquery like sq above, and use it as a sub-expression in q as if it were a normal table, with probability given by p, and its possible-worlds key given by a certain subset $\bar{S}$ of $\bar{B}'$.

Three conditions must be met for this rewriting to be correct: (1) the tuple probability p computed by AGG must be correct; (2) in the output, tuples having the same value of $\bar{S}$ must be disjoint tuples and tuples having different values of $\bar{S}$ must be independent tuples; and, (3) each such probability must be independent of all the other tuples in the original query that it joins with. Recall that Key(R) denotes the set of key attributes for the possible worlds for R.

To check condition (1), consider the following:

Proposition 1. Consider the query sq above. Let Attr(R) denote the attributes of relation R (does not include the p attribute, which technically belongs only to $R^p$) and Attr(sq) denote the union of Attr(R) for all relations R in sq.

1. If AGG is sum, then p is computed correctly if $\exists R \in \bar{R}'$ s.t. Key(R)$\subseteq \bar{B}'$ and Attr(sq)$-\bar{B}' \subseteq$ Attr(R).

2. If AGG is prod_1_1, then p is computed correctly if $\forall R \in \bar{R}'$, Attr(sq)$-B \subseteq$ Key(R)

To check condition (2), consider the following:

Proposition 2. Consider the query sq above.

1. Two output tuples having the same values of $\bar{S}$ are disjoint events iff $\exists R \in \bar{R}'$ such that Key(R) $\subseteq \bar{S}$ and $\bar{B}' - \bar{S} \subseteq$ Attr(R).

2. Two output tuples having different values of $\bar{S}$ are independent events if $\forall R \in \bar{R}'$, $\bar{B}' - \bar{S} \subseteq$ Key(R).

Finally, to check condition (3), check that the relations used by sq do not occur again the rest of the query q.

Example Consider three probabilistic tables:
AmazonHighReviews$^p$ (asin, reviewer, p)
TitleMatch$^p$ (asin, imdbid, p)
IMDBHighRatedFilms$^p$ (imdbid, p)

with possible worlds keys
Key(AmazonHighReviews)={asin, reviewer}
Key(TitleMatch)={asin}
Key(IMDBHighRatedFilms)={imdbid}

Note that AmazonHighReviews and IMDBHighRatedFilms contain only independent tuples. Consider the query q:
q=TOP 5 SELECT DISTINCT A.reviewer
FROM AmazonHighReviews A,
TitleMatch T, IMDBHighRatedFilms I
WHERE A.asin=T.asin and T.imdbid=I.imdbid The query can be optimized by observing that the following subquery is a safe subquery:
sq=SELECT T.asin, sum(T.p*I.p) as p
FROM TitleMatchp T, IMDBHighRatedFilmsp I
WHERE T.imdbid=I.imdbid
GROUP BY T.asin The output of this subquery is a table Tmp$^p$ (as in, p) that can be treated as a base probabilistic table with possible world key asin and probability attribute p. To see why, verify that this subquery satisfies the three conditions for safe subquery:

For condition (1), use Prop. 4.1(1). Here $\bar{B}'$={asin} and Attr (sq)={asin, imdbid}. It can be seen that Key(TitleMatch) $\subseteq \bar{B}'$ and Attr(sq)$-\bar{B}' \subseteq$ Attr (TitleMatch), so the condition is met.

For condition (2), use Prop. 4.2. Here, $\bar{S}$={asin} since it is claimed that as in is the key for Tmp. Prop. 4.2(2) holds trivially because $\bar{B}' - \bar{S} = \emptyset$. Prop. 4.2(1) holds because Key (TitleMatch) $\subseteq \bar{S}$.

Condition (3) holds because all event tables outside Tmp are distinct from those inside.

Having verified that the subquery is indeed safe, rewrite query q by making sq a subquery:

$q_{safe-plan}$=TOP 5 SELECT DISTINCT A.reviewer

FROM AmazonHighReviews A, sq Tmp

WHERE A.asin=Tmp.asin

Thus, the table Tmp (asin, p) is computed inside the query engine, and treated like a base query by MS. The rest of MS remains unchanged. The new query has the same number of groups as the original query, but each group is much smaller, since some of the probabilistic computation has been pushed onto the query engine.

Experiments

The current approach was evaluated experimentally to address the following five questions: (1) what is the scale of probabilistic databases when modeling imprecisions; (2) how does the new query evaluation method compare to the current state of the art; (3) how effective is the MS approach over a naive approach; (4) how effective are the optimizations; and, (5) how sensitive is the system's performance on the choice of $\delta$ and $\epsilon$.

Setup The experiments were run on a dual processor Intel Xenon™ 3 GHz Machine with 8 GB of random access memory (RAM) and two 400 GB hard disk drives. The operating system used was Linux™ with kernel version 2.6.12 high-mem build. The database was DB2 UDB™ Trial Edition, v. 8.2. Due to licensing restrictions DB2 was only able to use one of the cores. Indexes and configuration parameters such as buffer pools were tuned by hand.

Methodology For each running time the experiment was performed five times, dropping the highest and the lowest and averaging the remaining three runs. The naive simulation method was capped at 20 minutes runtime. Between each experiment, the database was forced to terminate all connections. The same experiments were not run repeatedly to minimize caching effects, but the cache was allowed to be warm. In the precision/recall experiments, the precision and recall are defined as the fraction of the top k answers returned by the method being evaluated that overlap with the "correct" set of top k answers. In order to compute the latter, the exact tuple probabilities were computed, which are intractable. The approximate values returned by the simulation algorithm with very low settings for $\epsilon$ and (i.e., $\epsilon$=0.001 and 5=0.01) were used.

Case Studies

In an empirical study, imprecisions were modeled in three application domains. The first integrates the IMDB™ movie database with reviews from Amazon™, as described in a simplified form above, and the sources of imprecisions are fuzzy object matches (for titles, actors, and directors), and the confidence in the Amazon™ reviews ("how many people found this review useful"). The second application integrates IMDB™ with reviews collected from a USENET™ site. These reviews were in free text, and information extraction techniques were used to retrieve for each review: (a) the movie; and, (b) the rating. The imprecisions here were generated by information extraction tools. In the third application, human activity recognition data obtained from body-worn sensors were used. The data were first collected from eight different sensors (accelerometer, audio, IR/visible light, high-frequency light, barometric pressure, humidity, temperature, and a compass heading) in a shoulder-mounted multi-sensor board, collected at a rate of four readings per second, then classified into N=10 classes of human activity $A^1, A^2, \ldots, A^N$, one for each subject and each time unit. The classes were: riding an elevator up or down, driving a car, riding a bicycle, walking up or down stairs, jogging, walking, standing, and sitting. The imprecisions here come from the classification procedure, which results in probability distribution on the N activities.

FIG. 7 illustrates brief summaries 70 of the probabilistic data in each of these applications. Each application required between two and four base probabilistic tables, and between one to three SQL views for complex probabilistic correlations. In addition to the probabilistic data, IMDB™ had some large deterministic tables (over 400 k movies, 850 k actors, and 3M casts, not shown in the Figure), which are part of the query processor's input in the experiments below, and are thus important for evaluation.

Query Performance

Below are reported measurements only from the first data set (IMDB™-Amazon™ integration), which was the largest and richest. The processor's performance was mostly affected by two query parameters: the number of groups (denoted n above) and the average size of each group. In additional experiments (not shown), it was observed that the performance was less affected by the number of probabilistic tables in the query (denoted m above), which roughly corresponds to the number of sources of evidence in the imprecise data.

By choosing each parameter to be small (S) or large (L) four classes of queries were obtained, denoted as SS, SL, LS, and LL respectively. One query was chosen from each class, and the selected queries 80 are shown in FIG. 8. The queries are:

SS In which years did Anthony Hopkins appear in a highly rated movie? (The system returned the top answer 2001, the year he was in Hannibal.)

SL Find all actors who were in Pulp Fiction who were in two very bad movies in the five years before Pulp Fiction. (Top 2 Answers: Samuel L Jackson and Christopher Walken.)

LS Find all directors who had a low rated movie between 1980 and 1989. (Top 2 Answers: Richard C. Sarafian for *Gangster Wars* and Tim King for *Final Run*.)

LL Find all directors who had a low rated drama and a high rated comedy less than five years apart. (Top Answer: Woody Allen.)

Unless otherwise stated, the confidence and precision parameters were respectively $\epsilon=0.01$, $\delta=0.01$, and the MS algorithm that was used was MS_RankK (see above), which finds the top k results and sorts them by rank.

Comparison with Other Methods The state of the art in query evaluation on probabilistic databases is to either compute each query answer exactly, using a complete Monte Carlo simulation (this method is referred to as "naive(N)"), or to approximate the probabilities using some strategies by ignoring their correlations. The first results in much larger running times than MS: see a graph 90 in FIG. 9A and note the logarithmic scale. In the query examples noted above, the naive method timed out for the LS and LL queries. The approximation method is much faster than MS, but results in lower precision/recall, due to the fact that it ignores correlations between imprecisions, which is shown in a graph 92 in FIG. 9B. Note that, unlike a Monte Carlo simulation, where precision and recall can be improved by running longer, there is no room for further improvement in the approximate method. One of the queries (LS) flattened at around 60% precision/recall. The queries that reached 100% did so only when k reached the total number of groups and even then, the answers are much worse then it appeared, since their order was mostly wrong. This result clearly shows that correlations cannot be ignored when modeling imprecisions in data.

Analysis of MS The main idea behind the MS algorithm is that it tries to spend simulation steps on only the top k buckets. An experiment determined how the total number of simulation steps varies with k, and determined in which buckets the simulation steps are spent. Shown herein are the results for SS. FIG. 9C shows a graph 94 of the total number of simulation steps as a function of k, both for the TopK algorithm (which only finds the top k set without sorting it) and for the RankK algorithm (which finds and sorts the top k set). First, the graph clearly shows that RankK benefits from low values of k: the number increases linearly with k. Second, the graph shows that, for TopK, the number of steps is essentially independent on k, because most simulation steps are spent at the separation line between the top k and the rest. A deeper view is given by a graph 96 in FIG. 9D, which shows for each group (bucket), the number of simulation steps that were spent, for k=1, 5, 10, 25, and 50. For example, when k=1, most simulation steps are spent in buckets 1 to 5 (the highest in the order of the probability). The graph illustrates two interesting things, specifically that RankK correctly concentrates most simulation steps on the top k buckets, and that, once k increases beyond a given bucket's number, the number of simulation steps for that bucket does not further increase. The spikes in both graphs correspond to clusters of probabilities, where MS had to spend more simulation steps to separate them.

FIG. 9E shows a graph 98 illustrating the effect of k on the measured running time of each query. As expected, the running time scales almost linearly in k, so that the fewer answers requested by a user request, the faster the answers can be retrieved.

Effectiveness of the Optimizations Both the semi-join pruning and safe query rewriting optimizations were tested. The semi-join pruning was always effective for the queries with a large number of buckets (LS, LL), and harmless for the other two. The pruning was performed in the middleware, and the additional cost to the total running time was negligible. The safe-plan rewriting (SP) is more interesting to study, since it is highly non-trivial. FIG. 9A shows significant improvements (factors of 3 to 4) for the running times when the buckets are large (SL, LL), and modest improvements in the other cases. The query time in the engine differed, since now the queries issued are different—in one case (SL) the engine time was larger. FIG. 8 shows how the SP optimization affects the average group size, which explains the better running times.

Sensitivity to Parameters Finally, the system's sensitivity to the parameters $\delta$ and $\epsilon$ was tested (see above). Recall that the theoretical running time is $O(1/\epsilon^2)$ and $O(\log(1/(n\delta))$. FIG. 9F shows a graph 100 illustrating both the precision/recall and the total running time as a function of $1-\epsilon$, for two queries: LL and LS; k=20, $\delta=0.01$, and SP is turned off. The running time was normalized to that of the golden standard, $1-\epsilon=0.99$. As $1-\epsilon$ increases, the precision/recall quickly approaches the upper values, while the running time increases too, first slowly, then dramatically. There is a price to pay for very high precision/recall (which is what was done in all the other experiments, not discussed herein). However, there is some room to tune $1-\epsilon$. Around 0.9, both queries have a precision/recall of 90%-100%, while the running time is significantly less than the golden standard. The similar graphs for $\delta$ differ, and are much less interesting. The precisions/recall reaches 1 very fast, while the running time is almost independent on $\delta$. (The graphs look almost like two horizontal lines.) It is possible to choose δ in a wide range without degrading either precision/recall or performance.

Flowchart of Exemplary Logical Steps Used for Novel Method

FIG. 10 shows a flowchart 108 illustrating exemplary logical steps that can be employed for determining a number of top-rated answers resulting from a query of probabilistic data. The same approach is readily generalized to other types of entities and for other criteria besides probability. After the logic starts, a step 110 provides for input of a query of the probabilistic data. Optionally, the number of top-rated answers can be input by a user at this point; however, in another exemplary embodiment, the iterative computation that is determining the probability for the top answers can also be interrupted at anytime, enabling the top-rated answers thus far identified to be returned. Another alternative embodiment automatically ranks the answers that are returned based on a criteria, such as the probability that each answer is correct.

A step 112 then identifies possible answers to the query. Depending upon the nature of the query, there may be many possible answers, some having a very low probability of being a correct answer. So, a step 114 iteratively runs a computation (or simulation) that determines an initial probability for each possible answer, which enables a number of very low-rated answers to be excluded from further consideration. Another optional approach statically eliminates the low-rated answers without running computations on the possible answers.

Next, a step 116 selects lower and upper bounds of a critical region based on the results of the initial iterative computation or simulation that was run. Again, alternative methods can be employed to determine these bounds. A step 118 selects a subset of possible answers on which to iteratively run the computation or simulation, based on the range of probability or other criteria determined for the possible answers, thereby determining a refined approximate criteria for each possible answer in the subset. A decision step 120 determines if any range of criteria for a possible answer lies within the critical region, since the goal is to achieve an empty critical region (i.e., free of the range of criteria for any possible answer in the current subset). If this condition has not yet been achieved, the logic loops back to step 116 to select refined lower and upper bounds of the critical region, based on the results of the last computations run on the subset of possible answers. Step 118 is then repeated. The loop through steps 118-120 continues until the current critical region is free of the criteria for the possible answers in the current subset. Once this condition is met, the possible answers having a refined range of criteria to the right of the current refined critical region are the top-rated answers that are returned and presented to a user in a step 122. The logic is then completed.

Exemplary Computing System for Implementing Novel Approach

FIG. 11 illustrates details of a functional block diagram for an exemplary computing device 200, which can be employed for implementing a query of imprecise probabilistic data to return the top k responses. The computing device can be a typical personal computer, but can take other forms. For example, the computing device can be implemented as a smart phone, a personal data assistant, a gaming machine, or other type of logical device.

A processor 212 is employed in the exemplary computing device for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read-only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. Data store 218 may store the data that will be queried using the present novel approach, or the data may be stored remotely and accessed over a network, such as the Internet. The machine instructions are readable by the processor and executed by it to carry out the functions discussed above in regard to the exemplary embodiments. Also connected to the bus are a network interface 228, which couples to the Internet or other network 230, an input/output interface 220 (which may include one or more data ports such as a serial port, a universal serial bus (USB) port, a Firewire (IEEE 1394) port, a parallel port, a personal system/2 (PS/2) port, etc.), and a display interface or adaptor 222. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, both in regard to an operating system and any applications being executed by the computing system, enabling a user to interact with the system. For example, the top k answers that are produced by querying imprecise data can be displayed to a user on display device 226. An optical drive 232 is included for reading (and optionally writing to) CD-ROM 234, a DVD, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A computer-implemented method for efficiently automatically determining a number of top-rated probabilistic entities selected from a group of probabilistic entities to satisfy a condition, wherein the top-rated probabilistic entities are rated on a criteria that is computed for a set of probabilistic entities that satisfy the condition, the method comprising the steps of:

(a) determining an initial range of criteria for each probabilistic entity in the set of probabilistic entities, wherein determining the initial range includes performing a probabilistic, simulation-based computation on each probabilistic entity in the set of entities;

(b) computing a current critical range of criteria, based upon the ranges of criteria that were determined for each probabilistic entity;

(c) selecting a subset of probabilistic entities from the set on which to run further iterative computations to determine a refined range of criteria for each probabilistic entity of the subset of probabilistic entities, wherein selection of probabilistic entities to be included in the subset is based upon the range of criteria previously determined for the probabilistic entities, and wherein the subset of probabilistic entities includes an entity with first data and another entity with second data that has a lower computed probability of being accurate than a computed probability of the first data being accurate;

(d) repeating steps (b) and (c) until a current critical range does not include any portion of a refined range of criteria for any of the probabilistic entities in the subset, the number of probabilistic entities that are above the current critical range then comprising the number of top-rated probabilistic entities; and (e) presenting the number of top-rated probabilistic entities to a user, wherein the step of computing the current critical range of criteria comprises the steps of:

setting a lower critical bound for the current critical range of criteria based upon a $top_k$ refined lower bound, determined by running the computations on the probabilistic entities, where the $top_k$ refined lower bound is a $k^{th}$ largest refined lower bound of the probabilistic entities; and setting an upper critical bound for the current critical range based upon a $top_{k+1}$ refined upper bound for the probabilistic entities, determined by running the computations on the probabilistic entities, where the $top_{k+1}$ refined upper bound is a $k+1^{th}$ largest refined upper bound of the probabilistic entities.

2. The method of claim 1, further comprising the step of ranking the number of top-rated probabilistic entities by the range of criteria computed for each probabilistic entity.

3. The method of claim 1, further comprising the step of enabling a user to terminate iterative repetition of steps (b) and (c) at any time, returning an ordered set of top-rated probabilistic entities determined up to that time, without regard to any specified number of probabilistic entities.

4. The method of claim 1, wherein the step of selecting the subset of probabilistic entities for repetitively running the computations comprises the steps of:

(a) selecting each probabilistic entity for which a lower bound of the refined criteria is less than a critical lower bound of the current critical range of criteria and an upper bound of the refined criteria is greater than a critical upper bound of the current critical range of criteria; and if no probabilistic entity is selected; then, (b) selecting each pair of probabilistic entities, wherein for a first probabilistic entity of the pair, the lower bound of the refined criteria is less than the critical lower bound, and for the second probabilistic entity of the pair, the upper bound of the refined criteria is greater than the critical upper bound of the current critical range of criteria; and, if no pair of probabilistic entities is thus selected; then, (c) selecting each probabilistic entity for which a range between the lower bound of the refined criteria and the upper bound of the refined criteria includes corresponding ranges of all other probabilistic entities.

5. The method of claim 1, further comprising the step of initially reducing an extent of the critical range of criteria before iteratively running the computations repetitively on each probabilistic entity in the subset, by statically evaluating groups of the probabilistic entities.

6. A system for efficiently automatically determining a number of top-rated probabilistic entities selected from a group of probabilistic entities to satisfy a condition, wherein the top-rated probabilistic entities are rated on a criteria that is computed for a set of probabilistic entities that may satisfy the condition, comprising:

(a) a memory in which the group of probabilistic entities are stored and in which a plurality of machine executable instructions are stored;

(b) a user input for enabling a user to control the system and provide input data;

(c) an output device for presenting information to a user; and (d) a processor that is coupled to the memory, the user input, and the output device, the processor executing the machine executable instructions in the memory to carry out a plurality of functions, including:

(i) determining an initial range of criteria for each probabilistic entity in the set of probabilistic entities, wherein determining the initial range includes performing a probabilistic, simulation-based computation on each probabilistic entity in the set of entities;

(ii) computing a current critical range of criteria, based upon the ranges of criteria that were determined for each probabilistic entity;

(iii) selecting a subset of probabilistic entities from the set on which to run further iterative computations to determine a refined range of criteria for each probabilistic entity of the subset of probabilistic entities, wherein selection of probabilistic entities to be included in the subset is based upon the range of criteria previously determined for the probabilistic entities, and wherein the subset of probabilistic entities includes an entity with first data and another entity with second data that has a lower computed probability of being accurate than a computed probability of the first data being accurate;

(iv) repeating functions (ii) and (iii) until a current critical range does not include any portion of a refined range of criteria for any of the probabilistic entities in the subset, the number of probabilistic entities that are above the current critical range then comprising the number of top-rated probabilistic entities; and (v) presenting the number of top-rated probabilistic entities to a user with the output device, wherein the machine executable instructions further cause the processor to:

set a lower critical bound for the current critical range of criteria based upon a $top_k$ refined lower bound, determined by running the computations on the probabilistic entities, where the $top_k$ refined lower bound is a $k^{th}$ largest refined lower bound of the probabilistic entities; and set an upper critical bound for the current critical range based upon a $top_{k+1}$ refined upper bound for the probabilistic entities, determined by running the computations on the probabilistic entities, where the $top_{k+1}$ refined upper bound is a $k+1^{th}$ largest refined upper bound of the probabilistic entities.

7. The system of claim 6, wherein the machine executable instructions further cause the processor to rank the number of top-rated probabilistic entities by the range of criteria computed for each probabilistic entity.

8. The system of claim 6, wherein the machine executable instructions further cause the processor to enable a user to terminate iterative repetition of steps (b) and (c) at any time, returning an ordered set of top-rated probabilistic entities determined up to that time, without regard to any specified number of probabilistic entities.

9. The system of claim 6, wherein the machine executable instructions further cause the processor to select the subset of probabilistic entities by:

(a) selecting each probabilistic entity for which a lower bound of the refined criteria is less than a critical lower bound of the current critical range of criteria and an upper bound of the refined criteria is greater than a critical upper bound of the current critical range of criteria; and if no probabilistic entity is selected; then, (b) selecting each pair of probabilistic entities, wherein for a first probabilistic entity of the pair, the lower bound of the refined criteria is less than the critical lower bound, and for the second probabilistic entity of the pair, the upper bound of the refined criteria is greater than the critical upper bound of the current critical range of criteria; and, if no pair of probabilistic entities is thus selected; then, (c) selecting each probabilistic entity for which a range between the lower bound of the refined criteria and the upper bound of the refined criteria includes corresponding ranges of all other probabilistic entities.

10. The system of claim 6, wherein the machine executable instructions further cause the processor to initially reduce an extent of the critical range of criteria before iteratively running the computations repetitively on each probabilistic entity in the subset, by statically evaluating groups of the probabilistic entities.

11. A computer-implemented method for efficiently determining a number k of top-rated probabilistic answers in response to a query of a database that includes imprecise data, so that each top-rated probabilistic answer is associated with a probability that the probabilistic answer is correct that is greater than that of all other probabilistic answers in a set of possible probabilistic answers to the query, and wherein determining the probability that an probabilistic answer is correct requires an unknown number of iterative computations, the method comprising the steps of:

(a) repetitively running a computation on each possible probabilistic answer in the set for a predefined number of times, to compute an approximation of a lower bound and an upper bound for the probability that the possible probabilistic answer is correct, wherein running each computation includes performing a probabilistic, simulation-based computation on each possible probabilistic answer in the set;

(b) selecting a current critical region between a critical lower bound and a critical upper bound of probability;

(c) based upon relative values of the approximations of the lower and upper bounds of probability computed for the possible probabilistic answers and the critical lower bound and critical upper bound of the critical region, selecting possible probabilistic answers for repetitively running further computations to determine a further refined lower bound and a further refined upper bound of probability for each possible probabilistic answer selected, wherein the imprecise data includes an probabilistic answer with first data and another probabilistic answer with second data that has a lower computed probability of being accurate than a computed probability of the first data being accurate;

(d) iteratively repeating steps (b) and (c) until refined approximated lower bounds of each of k possible probabilistic answers are greater than or equal to the upper bound of a current critical region, indicating that said k possible probabilistic answers are the k top-rated probabilistic answers to the query; and (e) presenting the k top-rated probabilistic answers to a user, wherein the step of selecting the current critical region comprises the steps of:

setting the lower critical bound for the current critical region based upon a $top_k$ refined lower bound determined by running the computations on the possible probabilistic answers, where the $top_k$ refined lower bound is a $k^{th}$ largest refined lower bound of the probabilistic answers; and setting the upper critical bound for the current critical region based upon a $top_{k+1}$ refined upper bound for the possible probabilistic answers, determined by running the computations on the possible probabilistic answers, where the $top_{k+1}1$ refined upper bound is a $k+1^{th}$ largest refined upper bound of the probabilistic answers.

12. The method of claim 11, further comprising the step of ranking the k top-rated answers by the probability computed for each probabilistic answer.

13. The method of claim 11, further comprising the step of enabling a user to terminate iterative repetition of steps (b) and (c) at any time, returning an ordered set of top-rated probabilistic answers determined up to that time, without regard to any specified number of probabilistic answers.

14. The method of claim 11, wherein the step of selecting possible probabilistic answers for repetitively running the computations comprises the steps of:

(a) selecting each possible probabilistic answer for which the refined approximated lower bound is less than the critical lower bound and the refined approximated upper bound is greater than the critical upper bound of the current critical region; and if no possible probabilistic answer is selected; then, (b) selecting each pair of possible probabilistic answers wherein for a first possible probabilistic answer of the pair, the refined approximated lower bound is less than the critical lower bound, and for the second possible probabilistic answer of the pair, the refined approximated upper bound is greater than the critical upper bound of the current critical region; and, if no pair of possible probabilistic answers is thus selected; then, (c) selecting each possible probabilistic answer for which a range between the refined approximated lower bound and the refined approximated upper bound includes corresponding ranges of all other possible probabilistic answers.

15. The method of claim 11, wherein the step of repetitively running the computation comprises the steps of:

(a) for each time the computation is run, randomly selecting a possible world for a possible probabilistic answer;

(b) for each selected possible world, computing a truth value of a Boolean expression corresponding to the possible probabilistic answer;

(c) determining a frequency with which the Boolean expression is true as a function of the number of times preceding steps (a)-(b) have been run;

(d) determining a probability that each possible probabilistic answer is correct based upon the frequency; and (e) determining the approximated lower and upper bounds for the probability that each possible probabilistic answer is correct.

16. The method of claim 11, further comprising the step of initially reducing a range between the critical lower bound and the critical upper bound of the critical region before running the computations repetitively on each possible probabilistic answer by a static evaluation of groups of possible probabilistic answers.

17. The method of claim 11, wherein the step of determining the approximate lower bound and approximate upper bound are carried out by a query engine.

18. A system for efficiently determining a number k of top-rated probabilistic answers in response to a query of a database that includes imprecise data, so that each top-rated probabilistic answer is associated with a probability that the answer is correct that is greater than that of all other answers in a set of possible probabilistic answers to the query, and wherein determining the probability that an probabilistic answer is correct requires an unknown number of iterative computations, comprising:

(a) a memory in which the imprecise data are stored and in which a plurality of machine executable instructions are stored, wherein running each computation includes performing a probabilistic, simulation-based computation on each possible probabilistic answer in the set;

(b) a user input for enabling a user to control the system and provide input data;

(c) an output device for presenting information to a user; and (d) a processor that is coupled to the memory, the user input, and the output device, the processor executing the machine executable instructions in the memory to carry out a plurality of functions, including:

(i) repetitively running a computation on each possible probabilistic answer in the set for a predefined number of times, to compute an approximation of a lower bound and an upper bound for the probability that the possible probabilistic answer is correct;

(ii) selecting a current critical region between a critical lower bound and a critical upper bound of probability;

(iii) based upon relative values of the approximations of the lower and upper bounds of probability computed for the possible probabilistic answers and the critical lower bound and critical upper bound of the critical region, selecting possible probabilistic answers for repetitively running further computations to determine a further refined lower bound and a further refined upper bound of probability for each possible probabilistic answer selected, wherein the imprecise data includes a probabilistic answer with first data and another probabilistic answer with second data that has a lower computed probability of being accurate than a computed probability of the first data being accurate;

(iv) iteratively repeating functions (ii) and (iii) until refined approximated lower bounds of each of k possible answers are greater than or equal to the upper bound of a current critical region, indicating that said k possible probabilistic answers are the k top-rated probabilistic answers to the query; and (v) presenting the k top-rated probabilistic answers to a user, wherein the machine executable instructions further cause the processor to:

set the lower critical bound for the current critical region based upon a $top_k$ refined lower bound determined by running the computations on the possible probabilistic answers, where the $top_k$ refined lower bound is a $k^{th}$ largest refined lower bound of the probabilistic answers; and set the upper critical bound for the current critical region based upon a $top_{k+1}$ refined upper bound for the possible probabilistic answers, determined by running the computations on the possible probabilistic answers, where the $top_{k+1}$ refined upper bound is a $k+1^{th}$ largest refined upper bound of the probabilistic answers.

19. The system of claim 18, wherein the machine executable instructions further cause the processor to rank the k top-rated probabilistic answers by the probability computed for each probabilistic answer.

20. The system of claim 18, wherein the machine executable instructions further cause the processor to enable a user to terminate iterative repetition of steps (ii) and (iii) at any time, returning an ordered set of top-rated probabilistic answers determined up to that time, without regard to any specified number of probabilistic answers.

21. The system of claim 18, wherein the machine executable instructions further cause the processor to:

(a) select each possible probabilistic answer for which the refined approximated lower bound is less than the critical lower bound and the refined approximated upper bound is greater than the critical upper bound of the current critical region; and if no possible probabilistic answer is selected; then, (b) select each pair of possible probabilistic answers wherein for a first possible probabilistic answer of the pair, the refined approximated lower bound is less than the critical lower bound, and for the second possible probabilistic answer of the pair, the refined approximated upper bound is greater than the critical upper bound of the current critical region; and, if no pair of possible probabilistic answers is thus selected; then, (c) select each possible probabilistic answer for which a range between the refined approximated lower bound and the refined approximated upper bound includes corresponding ranges of all other possible probabilistic answers.

* * * * *